United States Patent [19]
Dombrowski et al.

[11] Patent Number: 5,800,221
[45] Date of Patent: Sep. 1, 1998

[54] MULTIPOSITION READABLE TRIM POSITION INDICATOR AND METHODS OF USING SAME

[75] Inventors: Thomas A. Dombrowski, Franklin, Wis.; Melvin P. Sobol, Hicksville; Michael D. Fitzpatrick, Uniondale, both of N.Y.

[73] Assignee: Tdaka Products, L.L.C., Franklin, Wis.

[21] Appl. No.: 986,290

[22] Filed: Dec. 6, 1997

[51] Int. Cl.$^6$ .................................................. B60L 1/14
[52] U.S. Cl. ............................................................ 440/2
[58] Field of Search ........................ 440/1, 2; 114/270; 33/347, 365, 389, 391

[56] References Cited

U.S. PATENT DOCUMENTS

| | | | |
|---|---|---|---|
| 683,788 | 10/1901 | Nindemann . | |
| 917,179 | 4/1909 | Sprigg . | |
| 1,697,592 | 1/1929 | Erickson et al. . | |
| 2,045,631 | 6/1936 | Cavender | 33/215 |
| 2,609,616 | 9/1952 | Mueller | 33/206 |
| 2,877,561 | 3/1959 | Morse | 33/215 |
| 3,601,082 | 8/1971 | Wise | 440/2 |
| 3,844,247 | 10/1974 | Collis et al. | 440/2 |
| 3,931,784 | 1/1976 | Collis et al. | 440/2 |
| 4,005,674 | 2/1977 | Davis | 440/2 |
| 4,843,725 | 7/1989 | Harris | 33/391 |
| 5,283,957 | 2/1994 | Chou | 33/391 |
| 5,584,731 | 12/1996 | Dombrowski | 440/2 |

*Primary Examiner*—Stephen Avila
*Attorney, Agent, or Firm*—Michael D. Fitzpatrick

[57] ABSTRACT

A multiposition readable trim position indicator for outboard motors or the like for determining the tilt or angularity of the propeller with respect to a parallel position to the water level. The trim position indicator is attached to the side of the top cover of the outboard motor to give an indication of the angle between the axis of the outboard motor propeller and the water surface. When the outboard motor is tilted, e.g. as the boat comes up to planing speed, the trim position indicator indicates the angular degree of tilt by means of a level-seeking mechanism therein which no longer is centered between two indicator markings. Consequently, appropriate trimming measures may be taken so that maximum propulsion is restored. Due to its unique design, the pointer face of this trim position indicator is readable from both a sitting position and a standing position in the boat. Methods of mounting the trim position indicator on outboard motors both with and without hydrofoil stabilizers are also provided.

20 Claims, 13 Drawing Sheets

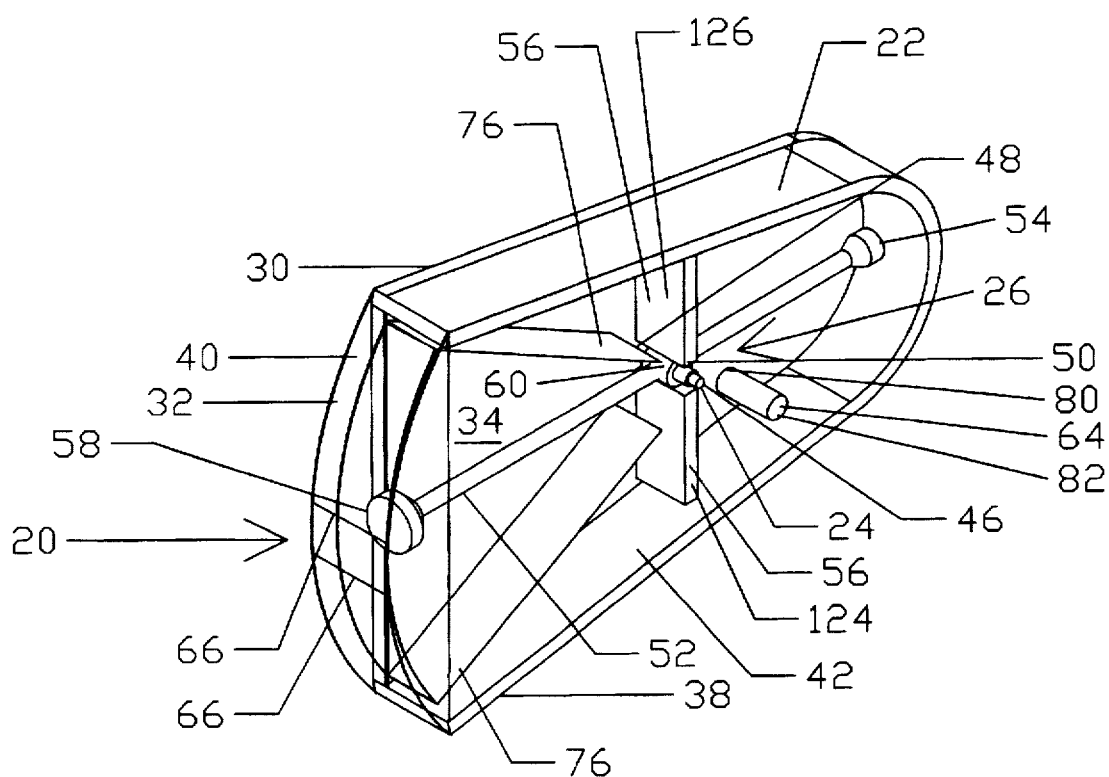

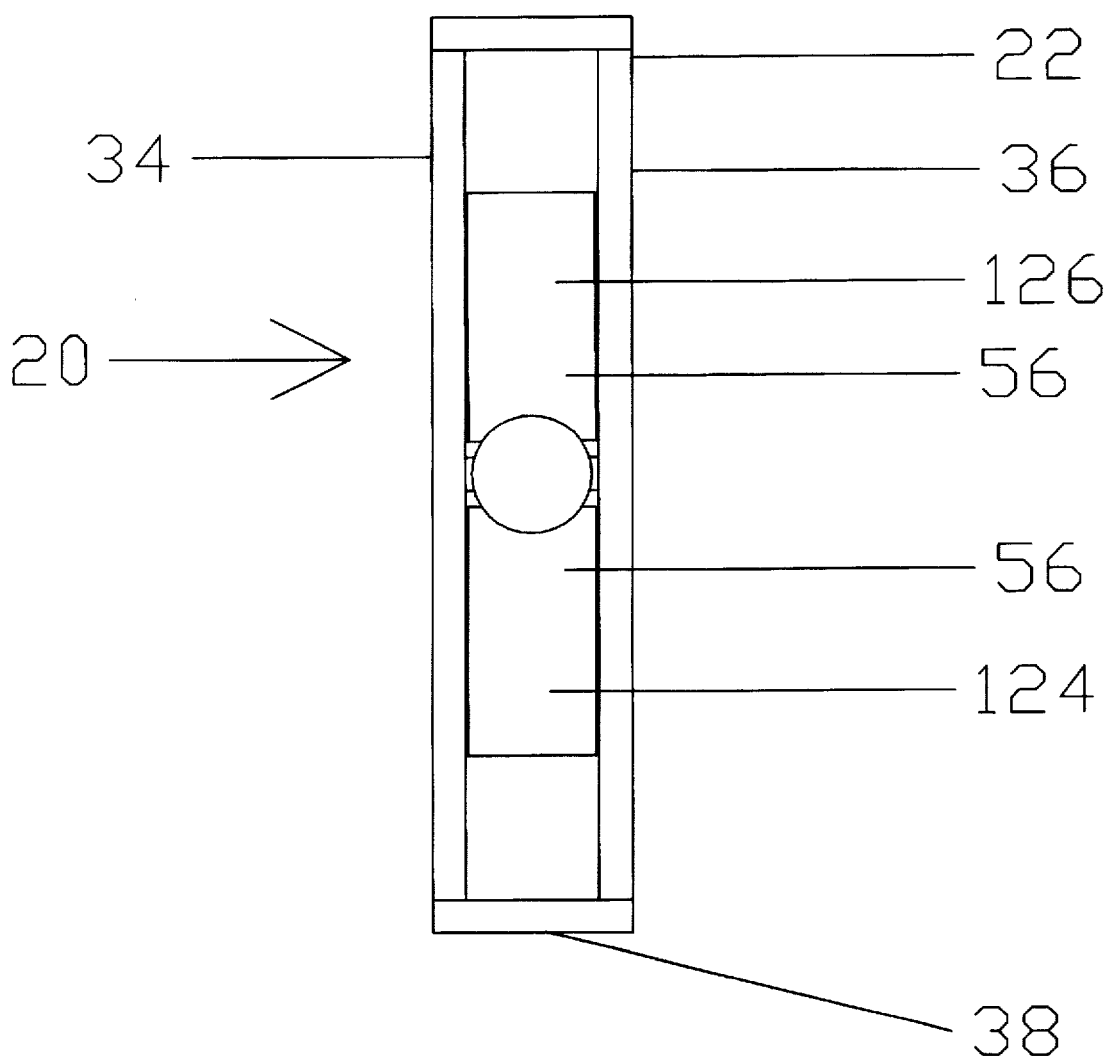

MULTIPOSITION READABLE TRIM POSITION INDICATOR AND METHODS OF USING SAME

1.0 RELATED APPLICATIONS

U.S. Pat. No. 5,584,731 to Thomas A. Dombrowski (first Applicant of instant patent application) issued on Dec. 17, 1996.

2.0 BACKGROUND

Across the United States, there have been millions of outboard motors sold. With the ready availability of parts, some outboard motors are in excess of 40 years of age and are still in use today. While the newer outboard motors continue to improve fuel economy and performance, they still face the same problem as the older outboard motors when it comes to wasting fuel. It has been determined that a brand new outboard motor may get only half the advertised mileage when in actual use. This is because the person using the outboard motor has improperly set the outboard motor's operational or tilt angle. The operational angle of the outboard motor must be adjusted so that the outboard motor's antiventilation plate is parallel to the surface of the water. If the antiventilation plate is not parallel to the surface of the water, there will be a high degree of propeller slippage, along with inducing fuel-robbing drag.

As mentioned in First Applicant's U.S. Pat. No. 5,584,731 which is incorporated by reference, on occasion, nearly all outboard motor owners have noted that their outboard motors will suddenly rev up excessively without a corresponding increase in boat speed—and frequently with a noticeable drop off in boat momentum. This phenomenon is called cavitation. Cavitation is that condition that occurs when the propeller is brought into contact with excessively disturbed or turbulent water. Air is drawn from the water's surface through the propeller, which thus relieved of the burden of drawing heavier water into its slip stream, responds by revolving faster. Acting more proportionately on air than on water, the propeller's effectiveness is reduced; the blades merely churn instead of thrusting.

To prevent cavitation and improve performance, an outboard motor should be operated in such a position that the propeller's thrust is parallel to the water line and so that when the boat is planing or nearly planing, the outboard motor's antiventilation plate is parallel to the water's surface. All outboard motors are equipped with a means for adjusting the angle between the outboard motor and the transom (the extreme stern crosswise member of the hull upon which the outboard motor is mounted). This may be accomplished by shifting a bolt location in a slotted member or by wing-nut adjusting bolts or by similar means dependent on the particular make of outboard motor.

Boat manufacturers, too, have nearly universally established a 12 degree angle from perpendicular to the transom. This angle is provided for with a dual purpose: to permit free adjustment of the outboard motor and also to prevent water turbulence and resulting propeller slipping.

On lightweight boats with relatively modest horsepower outboard motors, it may be found that the angle of attack of the propeller determined by the outboard motor angle of adjustment must be altered when boat load is increased or decreased. An outboard motor which is mounted in such manner that its propeller is tilted downward and away from a vertical axis with the water line will cause a lightweight boat to squat and perhaps even fail to get up on plane. With a sufficiently large outboard motor, which despite an incorrect angle of adjustment still succeeds in getting a boat up on plane, the steering characteristics will be difficult. The boat will tend to rear its bow high in the air and drop back onto the water again in a constant and annoying porpoising action. If, by contrast, the outboard motor is kicked in too close to the transom, it will get up on plane readily but will then ride nose-heavy and plow the water. This will not only reduce speed but will tend to make the boat broach in turning and take on a snaking steering characteristic in straight-ahead operation.

The final proper engine angle at which a boat will handle at its best and offer maximum performance is the angle at which the propeller is driving parallel to the water's surface.

The above background discussion is taken from pages 203–206 of *The Encyclopedia of Outboard Motorboating* by Hank Wieand Bowman (Library of Congress Catalog Card Number: 55-6649. Copyright 1955 by A. S. Barnes and Company, Inc., New York, N.Y.) which is incorporated by reference.

In the past, various devices have been employed with outboard motorboats and outboard-inboard motorboats providing so called power trim units for the boat to vary the planing attitude of the boat, and outboard motor tilt devices to vary the tilt of the outboard motor with respect to the boat transom. Such devices have included trim gauges of one type or another to indicate the degree of tilt of the outboard portion of the outboard motor with respect to the transom. Such indicators may also indicate the distance that the outboard motor is moved away from the transom which is simply another form of tilt indication with respect to the transom.

It has long been a problem to present the maximum propulsion force in such boats both for economy purposes and high speed performances. Such problems are well typified by an upward direction of thrust of the propeller causing the well-known rooster tail with a consequent loss of energy and fuel and a downward thrust causing a bow-heavy boat.

The trim position indicator of First Applicant's U.S. Pat. No. 5,584,731 was the first such device to indicate the relative position of an outboard motor with respect to the water and to give an accurate indication of whether or not the axis of the propeller shaft is parallel to the line of travel of the boat, or in other words whether or not the axis of the propeller shaft is parallel to the surface of the water. In such a parallel condition, the outboard motor is perpendicular to the surface of the water or line of travel of the boat. Thus, for the first time a simple device was disclosed which conveniently enabled one to tilt the outboard motor to the position yielding the maximum propulsion force, the smoothest ride at a given speed, and the maximum fuel economy for that speed. Unfortunately, however, the trim position indicator of First Applicant's U.S. Pat. No. 5,584,731 could not be viewed from a sitting position in front of the boat motor; one had to rise from one's seat and practically stand over the trim position indicator to see if it indicated the optimal tilt for the outboard motor. In addition, it was found to be extremely expensive to manufacture the molds to be used in manufacturing the trim position indicator.

For the foregoing reasons, there still remains a need for a device which can assist one in positioning the outboard motor with respect to the transom for maximum performance which is both economical to manufacture and easy to view from a sitting position in the boat.

3.0 SUMMARY

3.1 Opening

When Applicants' multiposition readable trim position indicator is attached to the side of the top cover of an outboard motor, it solves the above-mentioned problems not only by constantly displaying the angle of the antiventilation plate while the outboard motor is in operation (as did the trim position indicator of First Applicant's U.S. Pat. No. 5,584,731), but, because this angle of the antiventilation plate is now viewable from a seated position in front of the outboard motor, the operator no longer need stand over the trim position indicator to view its reading (as he has to when using the trim position indicator of U.S. Pat. No. 5,584,731). This provides the operator of the outboard motorboat with the opportunity to more conveniently adjust the tilt angle of the outboard motor to achieve peak fuel savings and performance.

Applicants' multiposition readable trim position indicator attaches to the side of the top cover of an outboard motor. It is a high visibility levelling device that is easy to install, easy to understand, and easy to use. Applicants' multiposition readable trim position indicator can be permanently installed in minutes. It requires no electricity to operate. Once it is installed, no further adjustment is necessary. It is designed to withstand exposure to ultraviolet light and outdoor storage conditions. It can be used on outboard motors from 1 to 300 horsepower. It will save fuel, and with less fuel burned, and less exhaust entering the water, the result will be less pollution. A properly adjusted outboard motor reduces steering torque, which is the pulling of the outboard motor to the left or right. A properly adjusted outboard motor will improve the ride of the boat. Rooster tails, porpoising, bow steering, and erratic behavior are all direct results of an improperly adjusted outboard motor.

Since most outboard motors mix both oil and gas in the fuel mixture, the consumer would be using less gasoline and two-stroke oil. During the winter months, national fuel and oil savings would be most affected in warm climate regions. The multiposition readable trim position indicator has been designed to work on all outboard motors, so fuel savings would be expected on any outboard motorboat using this new invention.

Thus by means of our multiposition readable trim position indicator, there has been provided an easier to view and more economical to manufacture trim position indicator which, when attached to the side of the top cover of an outboard motor, will indicate to the operator the angular position of the antiventilation plate with respect to the surface of the water or the degree of angular tilt away from the horizontal position. By adjusting the tilt angle of the outboard motor (the trim of the outboard motor), the antiventilation plate of the outboard motor may be brought to the horizontal position where the axis of the propeller shaft is parallel to the direction of travel of the boat and parallel to the surface of the water for maximum thrust and efficiency.

Thus, the present invention is directed to a device that satisfies this need for a simple, economical, easy to view, and convenient means to adjust the trim of a boat and the relative angle of the antiventilation plate of the outboard motor with respect to the water surface.

3.2 Contents

Basically the present invention comprises both a multiposition readable trim position indicator and the method of installing and using the same.

The trim position indicator consists, first of all, of a closed hollow housing. It has a level-seeking mechanism rotatably disposed therein. In the preferred embodiment, the level-seeking mechanism consists of a weighted elongated pointer, a counterbalance weight, and a pendulum weight which tends to keep the weighted elongated pointer horizontal. As a first option, the pendulum weight can be made nearly as wide as the distance between the two side walls of the trim position indicator and nearly long enough to reach to its floor so as to present as large a surface as possible to the air in the trim position indicator. Then if a boat vibration causes the pendulum weight to move, there will be sufficient air drag on the large surface area of the moving pendulum weight to quickly dampen its motion. As a second option, the housing of the trim position indicator may be filled with a liquid which will serve to dampen the motion of the level-seeking mechanism so that an accurate indication of level can be quickly obtained.

In the lesser preferred embodiment, the housing of the trim position indicator is filled with a damping liquid, the level-seeking mechanism is of lesser specific gravity than the liquid, and includes an elongated pointer, a counterbalance weight, and a lightweight float which, in seeking its highest position in the liquid, tends to keep the elongated pointer horizontal. The liquid serves to dampen the motion of the level-seeking mechanism so that an accurate indication of level can be quickly obtained.

When this trim position indicator is attached to the side of the outboard motor's top cover after calibration, it gives an accurate indication of the angle of the antiventilation plate of the outboard motor with respect to the water surface. With such an indication available, the boat operator can easily adjust the trim of the outboard motor so that the antiventilation plate is parallel to the water surface.

The trim position indicator has a strong two-sided foam adhesive affixed to one of its vertical sides. A piece of backing paper covers the outward-facing surface of the strong two-sided foam adhesive. During calibration of the trim position indicator, the boat's outboard motor is tilted until the antiventilation plate or propeller shaft is level. Then the backing paper is peeled off of the outward-facing surface of the strong two-sided foam adhesive attached to the side of the trim position indicator, the trim position indicator is held so that its interior level-seeking mechanism indicates a level condition, and, continuing to maintain this level condition, the trim position indicator is pressed firmly against either the left or the right side of the boat's outboard motor so that the outward-facing surface of its strong two-sided foam adhesive comes in contact with the side of the boat's outboard motor and adheres thereto.

Very unique are the methods for initially calibrating the trim position indicator prior to peeling the backing paper from the outward-facing surface of the strong two-sided foam adhesive in order to affix the trim position indicator in its final position on either the left or right side of the outboard motor's top cover. For example, for those outboard motors not having a hydrofoil stabilizer attached to the antiventilation plate, the method briefly is:

(a) Place a line level on the upper surface of the antiventilation plate at an orientation parallel to the axis of the propeller shaft;

(b) Tilt the outboard motor until the line level indicates level; and (c) Peel the backing paper off the outward-facing surface of the strong two-sided foam adhesive attached to the side of the trim position indicator, and hold the trim position indicator so that its interior level-seeking mechanism indicates level. Holding the trim position indicator in this orientation, press the trim position indicator against the side of the boat's outboard motor.

In the event the antiventilation plate of the outboard motor has a hydrofoil stabilizer mounted on its upper surface, there will usually be enough clearance between the antiventilation plate and the hydrofoil stabilizer for two thin strips of metal or plastic to be inserted in the clearance (projecting outward therefrom like miniature diving boards) and sufficiently spaced apart to provide two support surfaces for a line level to be placed thereon. The line level is then placed on these two support surfaces in an orientation parallel to the axis of the propeller shaft prior to performing step (b) above. If there is insufficient clearance between the antiventilation plate and the hydrofoil stabilizer for the insertion of these two strips of metal, strips of metal with strips of two-sided sticky tape attached at the end of their upper surface are pressed against the lower surface of the antiventilation plate to provide the two support platforms for a line level to rest thereon. The line level could also be placed directly on the propeller shaft for proper calibration, after removing the propeller.

The above features are objects of this invention. Yet further objects are as follows:

One of the primary objects of the present invention is to provide a multiposition readable trim position indicator which provides an indication of the relative angle between the propeller shaft and the surface of the water so that the trim of a boat may be adjusted for maximum performance and fuel economy, and best ride and handling.

Another object is to provide a trim position indicator having a solid pointer therein which will not break up as an air bubble in a line level would under the conditions of vibration normally encountered on a fast moving outboard motorboat.

An additional object is to provide a trim position indicator whose liquid will not freeze in colder weather.

Yet another object is to provide a trim position indicator which is easy to read and use even in poorly lit surroundings.

Another object is to provide a trim position indicator in which the level-seeking mechanism therein quickly assumes a new position without excessive oscillation when the trim position indicator is tilted.

Still another object is to provide a trim position indicator in which the level-seeking mechanism therein indicates the angle of tilt of the trim position indicator by the new position it assumes when the trim position indicator is tilted.

Still another object is to provide a trim position indicator which can easily be initially calibrated even when the outboard motor on which it will be used has a hydrofoil stabilizer attached to the antiventilation plate.

Yet another object is to provide a trim position indicator which can be installed in minutes, and is immediately available for use.

A still further object is to provide a trim position indicator that does not require electric power for operation.

A further object is to provide a trim position indicator that is simple, easy to use, and maintenance free.

A still further object is to provide a trim position indicator that is economical in cost to manufacture.

These and other objects, features, aspects, and advantages of the present invention will become better understood with regard to the following description, appended claims, and accompanying drawings and will be otherwise apparent to those skilled in the art.

For the purpose of illustration of this invention, two alternate preferred embodiments and one non-preferred embodiment are shown in the accompanying drawings. It is to be understood that this is for the purpose of example only and that the invention is not limited thereto.

4.0 BRIEF DESCRIPTION OF THE DRAWINGS

FIG. 12 shows a perspective view of the second alternate preferred embodiment with parts removed to reveal the optional version of the positioning means of the second alternate preferred embodiment; and FIG. 13 shows a front view of the second alternate preferred embodiment with parts removed to reveal the optional version of the positioning means of the second alternate preferred embodiment.

5.0 DESCRIPTION

Figure 1:
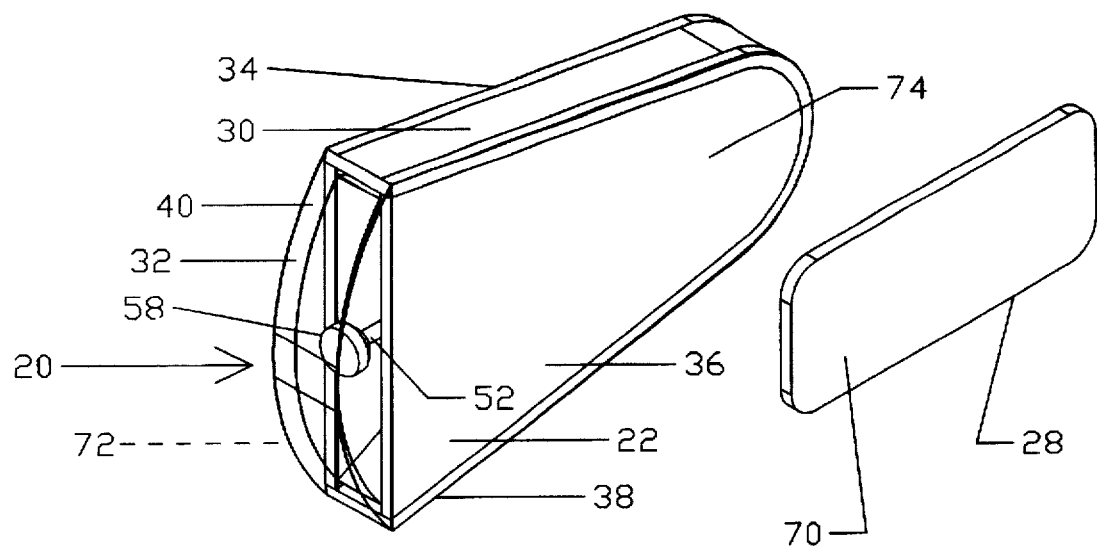
FIG. 1 shows a perspective view of the preferred embodiment with attachment means about to be attached.

5.1 Definitions antiventilation plate—plate mounted on lower unit above propeller line to prevent boat and surface disturbances from causing turbulent water to reach propeller. (The antiventilation plate is also known as the anti-cavitation plate.)

bow—The foremost or front part of a boat.

cavitate (cavitation)—propeller slippage in disturbed water causing the engine to rev excessively without corresponding forward motion. Cavitation is that condition which arises when the propeller is brought into contact with excessively disturbed or turbulent water. Air is drawn from the water's surface through the propeller, which, relieved of the burden of drawing the heavier water into its slip stream, responds by revolving faster. Acting more proportionately on air than on water, the propeller's effectiveness is reduced; the blades merely churn instead of thrusting.

hydrofoil stabilizer—a device with aerodynamic properties attached usually to the upper surface of the antiventilation plate to reduce cavitation and porpoising and bring the stern up and force the bow down.

light gas—a gas such as helium or hydrogen which is lighter than air.

lower unit—all parts of an outboard motor below the powerhead.

pitch—the distance forward the propeller would advance in one revolution if it operated in a semisolid substance with no slippage.

porpoise—The action of an improperly trimmed boat or an underpowered boat wherein the bow lifts high out of the water and slaps down again onto the water surface repeatedly.

trim gauge—a device which displays the relative angle between the transom (back of the boat) and the outboard motor so adjustments can be made for best ride, performance, fuel economy, and handling.

rooster tail—The spray following an outboard motor caused by the thrust of the propeller directed towards the surface of the water.

sticky tape—a two-sided tape with adhesive on both sides.

tilt angle—synonymous with trim angle.

transom—extreme stern crosswise member of the hull upon which the outboard motor is mounted.

trim—a term used to describe the way a boat rides in the water.

trim angle—the degree of tilt of the outboard portion of the outboard motor with respect to the transom. It can be referred to as the boat's trim angle, or the trim angle of the outboard motor.

trim position indicator—a device which indicates the angle of the propeller shaft with respect to the water surface.

trim—the difference between the draughts measured at the forward and after perpendiculars. May be expressed as an angle.

5.2 Overview

The preferred embodiment of the present invention consists of a closed hollow housing with a level-seeking mechanism which is rotatably disposed therein. Optionally the housing can be filled with a damping liquid. When a damping liquid is used, the level-seeking mechanism is manufactured to have a specific gravity greater than the liquid in which it is immersed. In this embodiment the first component of the level-seeking mechanism is a pivot ring which surrounds and is mounted on a pivot pin which extends between the two vertical side walls of the housing of the trim position indicator. The other three components of the level-seeking mechanism are fixedly attached to the pivot ring. The second component is a weighted elongated pointer whose face indicates that level has been achieved when the face is seen to be centered between two lines on a transparent portion (the clear transparent window) of the hollow housing. The third component of the level-seeking mechanism is a counterbalance weight which is attached to the pivot ring at a point 180 degrees of arc removed from the attachment point of the weighted elongated pointer. The counterbalance weight thus counterbalances the weighted elongated pointer. The fourth component is a downwardly hanging pendulum weight which is attached to the pivot ring at a point which is equidistant from the attachment points of the weighted elongated pointer and the counterbalance weight. The downwardly hanging pendulum weight tends to keep the level-seeking mechanism in a horizontal orientation regardless of the orientation of the closed hollow housing.

Alternatively, the pendulum weight can be made rectangular in shape and long enough and wide enough to nearly block the lower portion of the housing of the trim position indicator. In this shape, the anchor weight acts as a highly effective fan (by impeding air flow) to quickly damp any oscillatory movement of the level-seeking mechanism. In addition, when it is desired to provide even further damping, a rectangularly shaped lightweight strip of thin rigid material can be provided approximately 180 degrees of arc removed from the rectangularly shaped anchor weight. This rectangularly shaped lightweight strip of thin rigid material can be made long enough and wide enough to very nearly block the upper portion of the housing of the trim position indicator. This strip of rigid material will act as a fan (by impeding air flow) in concert with the elongated thin rectangularly shaped anchor weight to quickly and effectively damp any oscillatory movement of the level-seeking mechanism.

On either the left or right vertical side wall of the housing is attached a strip of two-sided adhesive foam mounting material or a piece of two-sided adhesive tape. This strip of strong two-sided adhesive foam or two-sided adhesive tape has two faces—the inward-facing surface and the outward-facing surface; the inward-facing surface is attached to the vertical side of the housing and the outward-facing surface is for pressing to the side of the top cover of a boat's outboard motor. The sticky adhesive on the outward-facing surface of the strong two-sided foam adhesive is covered with backing paper to keep the adhesive from sticking before the trim position indicator is placed in its final position on the side of the top cover. The trim position indicator is characterized by its indicating the relative angle between the propeller shaft and the surface of the water, as opposed to background art devices which only indicate the relative angle between the boat's outboard motor and the transom.

A lesser preferred embodiment of the present invention is the same as the preferred embodiment except that the closed housing of the trim position indicator is filled with a damping liquid and the level-seeking mechanism is manufactured to have a specific gravity less than the damping liquid. In this embodiment the first component of the level-seeking mechanism is a pivot ring which surrounds and is mounted on a pivot pin which extends between the two vertical side walls of the housing of the trim position indicator. The other three components of the level-seeking mechanism are fixedly attached to the pivot ring. The second component of the level-seeking mechanism is an elongated pointer whose face indicates that level has been achieved when the face is seen to be centered between two lines on a transparent portion (the clear transparent window) of the hollow housing. The third component of the level-seeking mechanism is a counterbalance weight which is attached to the pivot ring at a point 180 degrees of arc removed from the attachment point of the elongated pointer. The counterbalance weight thus counterbalances the elongated pointer. The fourth component is a lightweight float with a specific gravity less than that of the liquid in the housing. The lightweight float is fixedly attached to the end of an arm which is fixedly attached to and radially extends upward from the pivot ring of the level-seeking mechanism. The attachment point of the arm to which the lightweight float is attached is equidistant from the attachment points of the elongated pointer and the counterbalance weight. Being either made of a lightweight material or hollow and filled with air or a lightweight gas, the lightweight float tugs upward from the point where it is attached to the arm (which, as was mentioned, is attached to the pivot ring of the level-seeking mechanism) thus tending to hold the elongated pointer of the level-seeking mechanism in a horizontal orientation regardless of the orientation of the closed hollow housing. This lesser preferred embodiment of the trim position indicator is characterized by its indicating the relative angle between the propeller shaft and the surface of the water, as opposed to background art devices which only indicate the relative angle between the boat's outboard motor and the transom.

5.3 Detailed Description of the Elements

The preferred embodiment of the instant invention will be described in § 5.3.1, and the non-preferred embodiment will be described in § 5.3.2.

5.3.1 Detailed Description of the Elements of the Preferred Embodiment.

Figure 7:
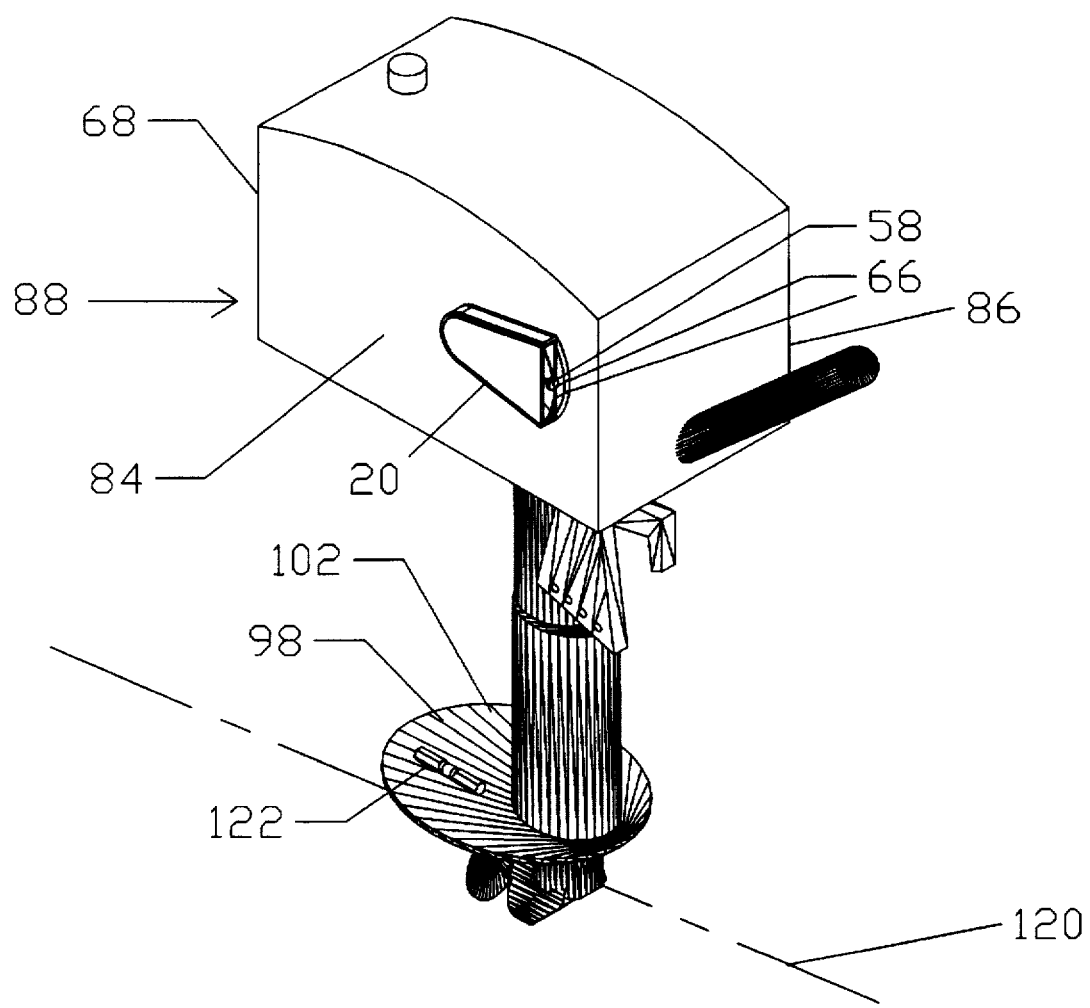
FIG. 7 shows a diagrammatic perspective view of the preferred embodiment mounted on a boat's outboard motor which does not have a hydrofoil stabilizer.

Turning now descriptively to the drawings, in which similar reference characters denote similar elements throughout the several views, FIG. 1 illustrates a trim position indicator for attachment to either the left or right side of the outboard motor's top cover 68 (shown in FIG. 7). In FIG. 1, the trim position indicator is generally shown as reference number 20. The trim position indicator 20 consists of a closed hollow housing 22, which contains the other components, and attachment means 28.

Figure 2:
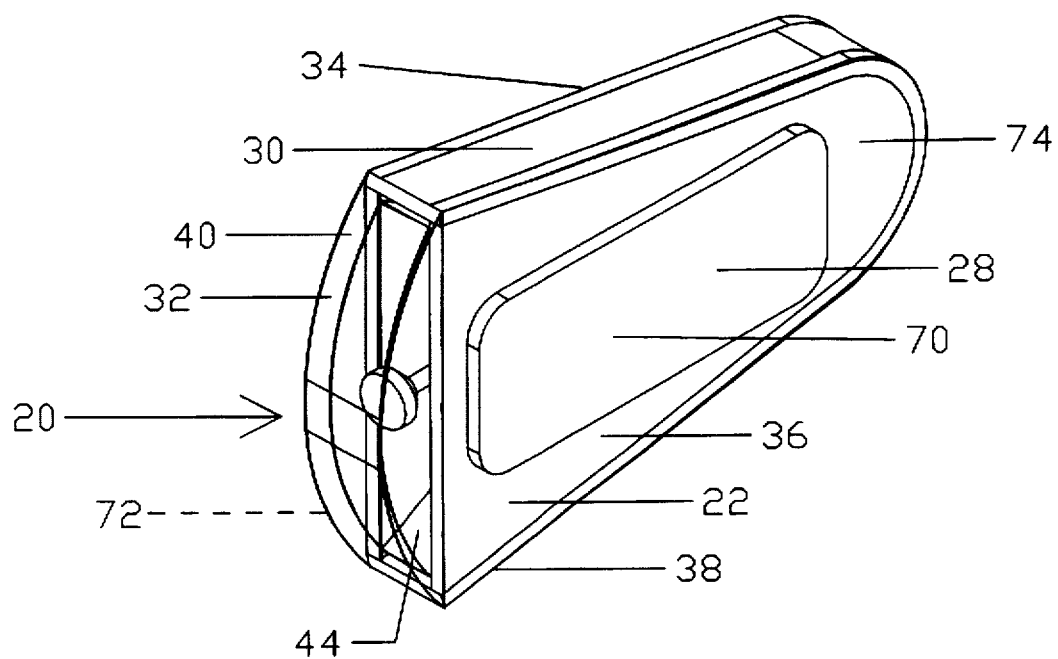
FIG. 2 shows a perspective view of the preferred embodiment with attachment means attached.

The closed hollow housing 22 has a top wall 30, a front wall 32, a left side wall 34, a right side wall 36, and a bottom wall 38. The front wall 32 has a clear transparent viewing window 40 which, preferably, arches outward from the front wall 32. The left and right side walls 34, 36 are disposed in spaced apart and substantially parallel relationship to each other. The attachment means 28 is attached to the left side wall 34 of the trim position indicator 20 when it is desired to attach the trim position indicator 20 to the right side 86 of the outboard motor top cover 68 and attached to the right side wall 36 when it is desired to attach the trim position indicator 20 to the left side 84 of the outboard motor top cover. FIG. 2 shows the attachment means 28 attached to the right side wall 36 of the trim position indicator 20.

Figure 3:
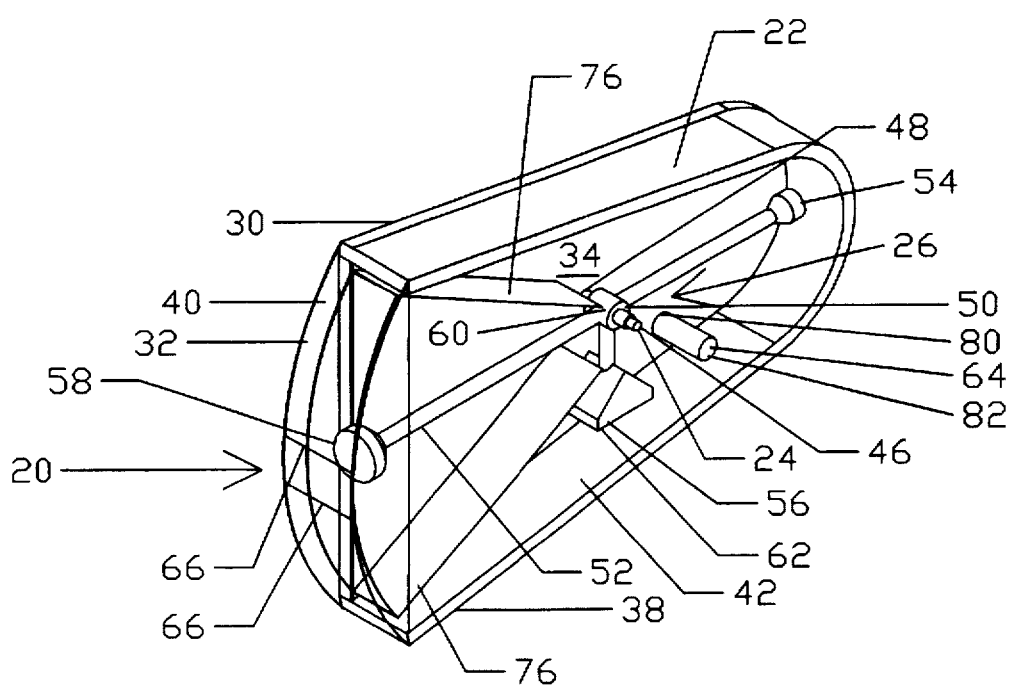
FIG. 3 shows a perspective view of the first alternate preferred embodiment with parts removed.

Turning to FIG. 3 which shows the trim position indicator 20 with its right side wall 36 (and attachment means 28) removed, it can be seen that the interior components of the trim position indicator 20 are a horizontal pivot pin 24 and a level-seeking mechanism generally shown as 26.

As shown in FIG. 3, the left side wall 34 and right side wall (removed for this figure) define a space 42 within the housing 22. Optionally, the housing 22 is filled with a damping liquid 44 (shown diagrammatically in FIG. 2—but since the liquid completely fills the housing, it appears invisible) so that the number of oscillations of the level-seeking mechanism 26 will be minimized if boat vibrations set it in motion. Preferably, the damping liquid 44, when one is used, is a nonfreezing liquid such as ethylene glycol or methyl alcohol.

FIG. 3 shows the level-seeking mechanism 26 disposed within the housing 22 of the trim position indicator 20. The level-seeking mechanism 26 consists of a cylindrical pivot ring or sleeve 50, to the outer surface of which are fixedly attached an elongated pointer 52, a counterbalance weight 54, and positioning means 56. The pivot ring 50 of the level-seeking mechanism has a hole passing through the center of it so that the level-seeking mechanism 26 can be mounted on the pivot pin 24. The pivot ring is thus in the shape of a collar or a sleeve.

As shown in FIG. 3, the horizontal pivot pin 24 is disposed within the closed housing 22 (the right side wall has been removed to facilitate showing the interior components) and extends from the left side wall 34 to the right side wall 36 (removed). The first end 46 of the horizontal pivot pin 24 is attached to the right side wall 36, and the second end 48 of the horizontal pivot pin 24 is attached to the left side wall 34.

There are two ways in which the level-seeking mechanism 26 and the horizontal pivot pin 24 can be connected for disposing the level-seeking mechanism/horizontal pivot pin combination in the housing 22 of the trim position indicator 20. In the first and preferred way, the first end 46 of the horizontal pivot pin 24 is rotatably attached to the right side wall 36, and the second end 48 of the horizontal pivot pin 24 is rotatably attached to the left side wall 34. Thus, the pivot pin 24 is rotatably supported in the housing 22 of the trim position indicator 20. The level-seeking mechanism 26 is then fixedly mounted on the pivot pin 24, the pivot pin 24 extending through the hole in the center of the pivot ring 50 of the level-seeking mechanism. Thus, in this first way, the pivot pin 24 and the level-seeking mechanism 26 are essentially of one piece construction.

In the second and lesser preferred way of connecting the level-seeking mechanism 26 to the pivot pin 24, the first end 46 of the horizontal pivot pin 24 is fixedly attached to the right side wall 36, and the second end 48 of the horizontal pivot pin 24 is fixedly attached to the left side wall 34. Thus, the pivot pin 24 is fixedly supported in the housing 22 of the trim position indicator 20. The level-seeking mechanism 26 is then rotatably mounted on the pivot pin 24, the pivot pin 24 extending through the hole in the center of the pivot ring 50 of the level-seeking mechanism 26.

In both the first and second of these ways, the level-seeking mechanism 26 is viewable through the clear transparent viewing window 40.

The pivot ring 50, therefore, provides a base to which are fixedly attached an elongated pointer 52, a counterbalance weight 54, and positioning means 56.

The elongated pointer 52 has a face end 58 and an attachment end 60. The attachment end 60 of the elongated pointer 52 is fixedly attached to the pivot ring 50 and projects radially outward therefrom in the direction of the viewing window 40.

The counterbalance weight 54 is attached to the pivot ring 50 at a point approximately 180 degrees of arc from the attachment end 60 of the elongated pointer 52 and extends radially outward therefrom in a direction approximately 180 degrees of arc from the direction in which the face end 58 of the elongated pointer 52 is pointing. The weight and length of the counterbalance weight are selected to be such that the moment of the counterbalance weight 54 about the axis of the pivot pin 24 will be equal to the moment of the elongated pointer 52 about the axis of the pivot pin 24. (Throughout this specification and the claims which follow, moment shall be defined as the weight of an object times the distance of the center of gravity of that object from the axis about which that object is free to rotate, which, in this specification, is the axis of the pivot pin.) Thus the counterbalance weight 54 balances the elongated pointer 52, and tends to keep the elongated pointer 52 in a horizontal orientation.

The positioning means 56 is fixedly attached to the pivot ring 50. The positioning means 56 will, by gravity, maintain the elongated pointer 52 and the counterbalance weight 54 in a horizontal orientation. Preferably, the positioning means 56 is an anchor weight 62 which is fixedly attached to a point on the outer circumference of the pivot ring 50 which is approximately 90 degrees of arc from the attachment point of the elongated pointer 52 and the attachment point of the counterbalance weight 54. In this embodiment, the specific gravity of the anchor weight 62 is greater than the specific gravity of the damping liquid 44 (if a damping liquid is used). Preferably, the moments of the elongated pointer 52 and the counterbalance weight 54 about the pivot pin (these two moments are equal to each other) are sufficiently larger than the moment of the positioning means about the pivot pin that the time for the level-seeking mechanism 26 to come to rest after having been set in motion is minimized.

Alternatively, as shown in FIG. 12, an alternate anchor weight 124 replaces anchor weight 62 and, as will be explained, any need for a damping liquid is completely obviated. This alternate anchor weight is thin, rectangularly shaped, and sufficiently wide and long so that it restricts the passage of air through the region of the closed housing 22 which is below the pivot ring 50 (best seen in FIG. 13 which is a front view of FIG. 12 but with parts removed so that the alternate anchor weight 124 can be easily seen). Then if rough boat motion sets this alternate anchor weight 124 in oscillatory motion, air will have some difficulty passing around the side and bottom edges of this alternate anchor weight 124, and this difficulty, along with air drag on the surfaces of this moving alternate anchor weight 124, will very quickly damp out any oscillatory motion of the modified anchor weight 124. If even further damping is deemed necessary, an elongated thin rectangularly shaped strip of lightweight rigid material 126 can be attached to the pivot ring 50 at a point 180 degrees of arc removed from the point where the alternate anchor weight 124 is attached to the pivot ring 50. This thin strip of lightweight rigid material 126 will be made long enough and wide enough to restrict the passage of air through the region of the closed housing 22 which is above the pivot ring 50 (best seen in FIG. 13). This thin strip of lightweight rigid material 126 will serve the same damping function as the alternate anchor weight 124: If rough boat motion sets the positioning means 56 in motion, air drag on the surfaces of both the upper strip of rigid lightweight material 126 and the alternate anchor weight 124 will very quickly damp out that motion.

As shown in FIG. 12, the trim position indicator's positioning means 56 for this alternative version consists of an elongated thin rectangularly shaped anchor weight 124 which is fixedly attached to a point on the outer circumference of the pivot ring 50 which is approximately 90 degrees of arc from both the elongated pointer 52 and the counterbalance weight 54. This rectangularly shaped anchor weight 124 acts as a fan to damp any oscillatory movement of the level-seeking mechanism 26.

Preferably, the width of the elongated thin rectangularly shaped anchor weight 124 is just slightly less than the distance between the left side wall 34 and the right side wall 36 of the closed hollow housing 22, and the length of the anchor weight 124 is slightly less than the distance between the pivot ring 50 and the bottom wall 38 of the closed hollow housing 22, whereby air flow past the edges of the elongated thin rectangularly shaped anchor weight 124 is restricted, thus greatly increasing the damping effect of the anchor weight.

In some applications of Applicants' trim position indicator, it may be considered necessary to further dampen motion of the positioning means 56. For these applications, an elongated thin rectangularly shaped strip of rigid material 126 can be fixedly attached to a point on the outer circumference of the pivot ring 50 which is approximately 180 degrees of arc from the point at which the elongated thin rectangularly shaped anchor weight 124 is attached to the pivot ring 50. This strip of rigid material 126 will act as a fan in concert with the elongated thin rectangularly shaped anchor weight 124 to damp any oscillatory movement of the level-seeking mechanism 26.

Figure 4:
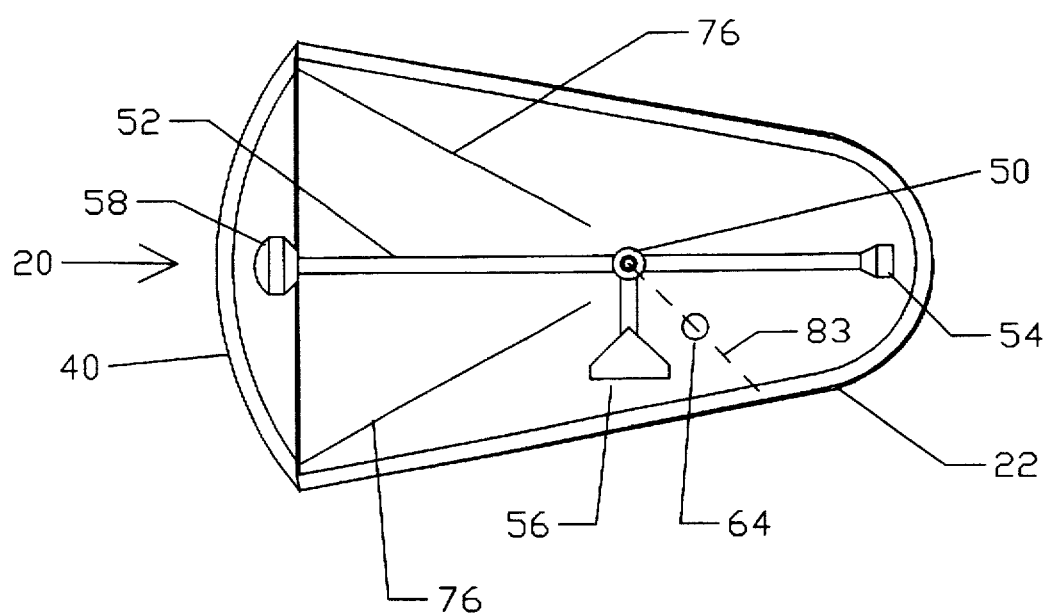
FIG. 4 shows an elevation view of the first alternate preferred embodiment with parts removed.

In order to keep the level-seeking mechanism 26 from banging around in the housing 22 during transport of the trim position indicator 20 or the boat's outboard motor 88 to which it has been affixed, a level-seeking mechanism pivot stop 64 is fixedly attached to the interior of the housing 22. Preferably, as shown in FIG. 3, the first end 80 of the level-seeking mechanism pivot stop 64 is fixedly attached to the left side wall 34, and the second end 82 of the pivot stop 64 is fixedly attached to the right side wall 36. Preferably, as shown in FIG. 4, this pivot stop is approximately located on the line (shown as dashed line 83) which is equidistant from the positioning means 56 and the counterbalance weight 54 and is close enough to the pivot ring 50 (thus also being relatively close enough to the positioning means 56 and the counterbalance weight 54) to restrict the degree of movement of the level-seeking mechanism 26 to about 30 degrees of arc about the pivot stop.

The level-seeking mechanism 26 is so disposed within the closed housing 22 that the face end 58 of the elongated pointer 52 is adjacent the clear transparent viewing window 40 and can be easily seen through the transparent viewing window 40. Further, since the clear transparent viewing window 40 is, preferably, arched or bowed outward, the face end 58 of the elongated pointer 52 can be seen from both in front of and to the side of the clear transparent viewing window 40.

The clear transparent viewing window 40 has two indicator markings 66, 66 on it. The distance between these two markings 66, 66 is equal to the width of the face end 58 of the elongated pointer 52. Preferably, the face end 58 of the elongated pointer 52 and the indicator markings 66, 66 are luminescent or fluorescent, so that the face end 58 and the indicator markings 66, 66 may be easily viewed in poorly lit surroundings.

The attachment means 28 facilitates attaching the trim position indicator 20 to either the left side 84 or the right side 86 of the outboard motor's top cover 68. Preferably, the attachment means 28 is a strip of strong two-sided foam adhesive 70 attached to either the exterior surface 72 of the left side wall 34 or to the exterior surface 74 of the right side wall 36 of the trim position indicator 20.

Thus the face end 58 of the elongated pointer 52 is viewable through the clear transparent viewing window 40 from a position in front of the outboard motor 88. Preferably, a pair of light shields 76, 76 is so disposed within the housing 22 (as shown by FIGS. 3, 4) that when the level-seeking mechanism is viewed through the clear transparent viewing window 40, the pair of light shields 76, 76 hides all of the level-seeking mechanism 26 except for the face end 58 of the elongated pointer 52. As shown in FIG. 4, the light shields form a sideways V with its vertex clipped off. The wide opening of the sideways V is adjacent to and as wide as the long dimension of the clear transparent viewing window 40, and the clipped off vertex of the sideways V is in the vicinity of the pivot ring 50. The elongated pointer 52 protrudes through the clipped off vertex of the sideways V formed by the two light shields 76, 76 and extends toward the clear transparent viewing window 40. Thus the two light shields 76, 76 essentially straddle (i.e., one is above and the other is below) the elongated pointer 52 being far apart from each other near the face end 58 of the elongated pointer 52 and being close together near the attachment end 60. The light shields thus effectively hide from the boat operator the positioning means 56 and the counterbalance weight 54. This makes it much easier to distinguish the face end 58 of the elongated pointer 52 when one looks at it through the clear transparent viewing window 40. The navigator need merely adjust the tilt angle of the outboard motor 88 until the face end 58 of the elongated pointer 52 is centered between the two indicator markings 66, 66 on the clear transparent viewing window 40.

5.3.2 Detailed Description of the Elements of the Non-preferred Embodiment.

Figure 5:
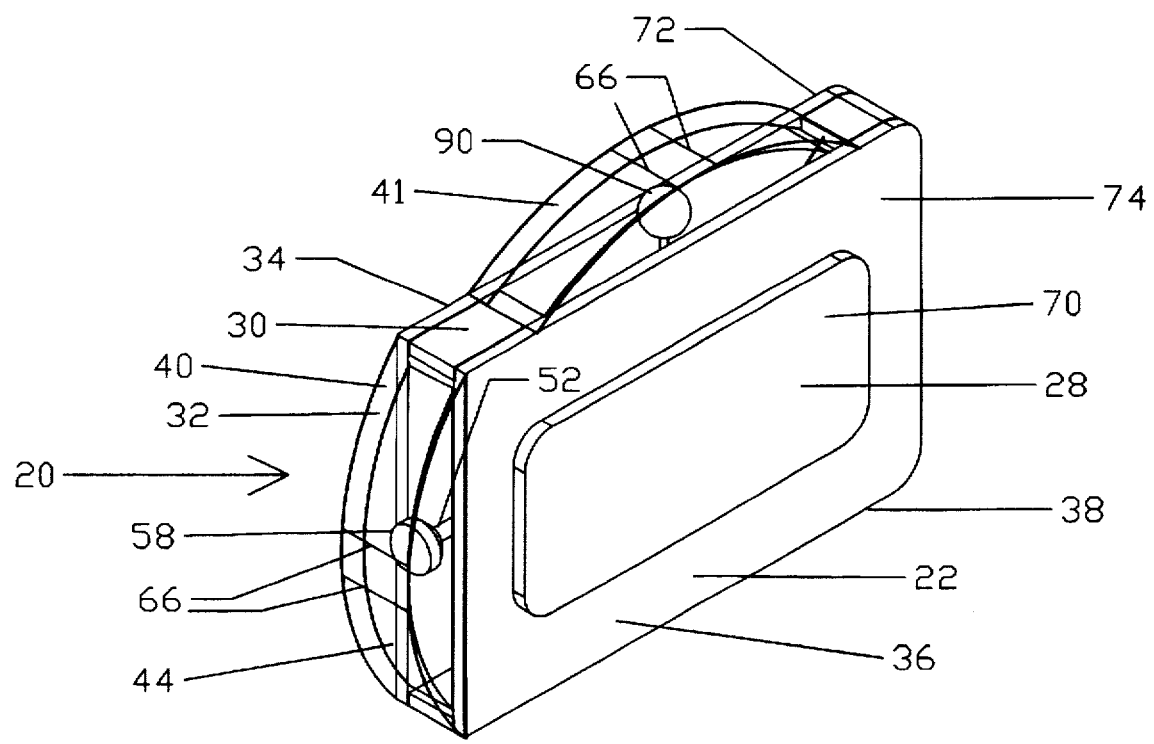
FIG. 5 shows a perspective view of the non-preferred embodiment with attachment means attached.

Turning now descriptively to the drawings, in which similar reference characters denote similar elements throughout the several views, FIG. 5 illustrates the non-preferred embodiment of a trim position indicator for attachment to either the left or right side of the outboard motor's top cover 68. In FIG. 5, the trim position indicator is generally shown as 20. The trim position indicator 20 consists of a closed hollow housing 22, which contains the other components, and attachment means 28.

The closed hollow housing 22 has a top wall 30, a front wall 32, a left side wall 34, a right side wall 36, and a bottom wall 38. The front wall 32 has a clear transparent viewing window 40. The left and right side walls 34, 36 are disposed in spaced apart and substantially parallel relationship to each other. The attachment means 28 is attached to the left side wall 34 of the trim position indicator 20 when it is desired to attach the trim position indicator 20 to the right side 86 of the outboard motor top cover 88 and attached to the right side wall 36 when it is desired to attach the trim position indicator 20 to the left side 84 of the outboard motor top cover 88 (Please see FIG. 11). FIG. 5 shows the attachment means 28 attached to the right side wall 36 of the trim position indicator 20.

Figure 6:
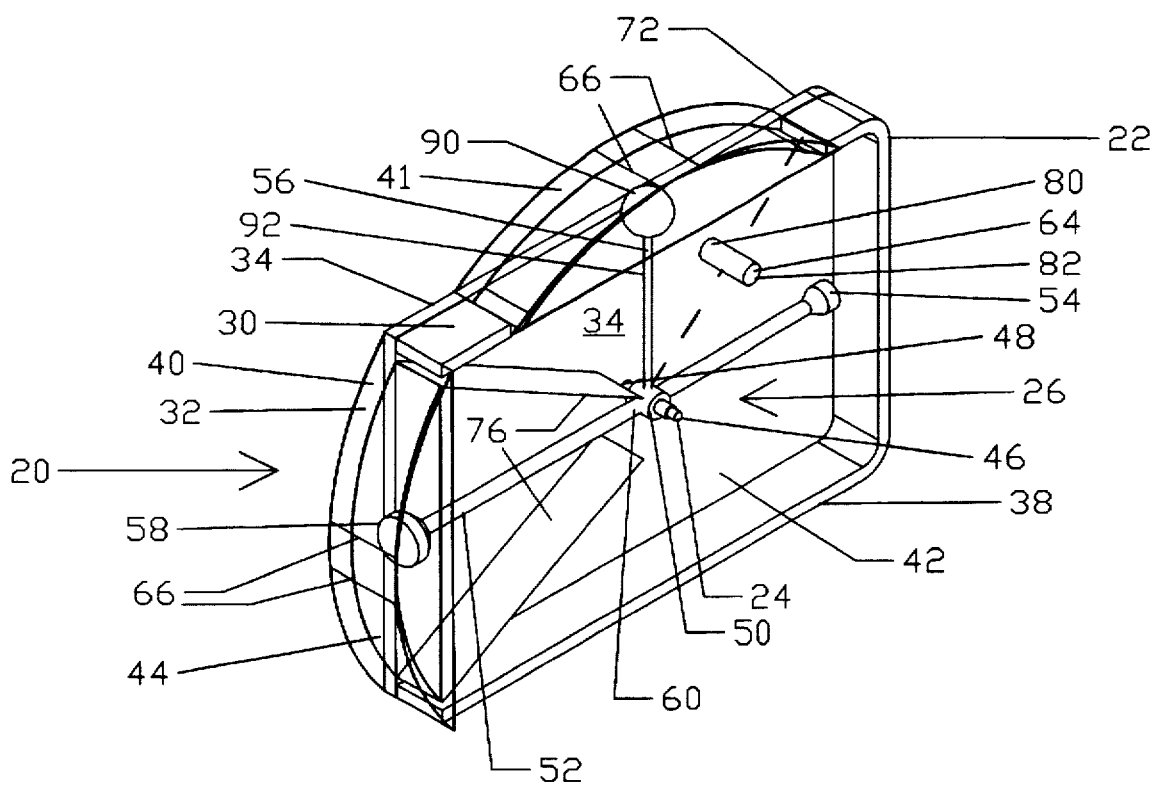
FIG. 6 shows a perspective view of the non-preferred embodiment with parts removed.

Turning to FIG. 6 which shows the trim position indicator 20 with its right side wall 36 (and attachment means 28) removed, it can be seen that the interior components of the trim position indicator 20 are a horizontal pivot pin 24 and a level-seeking mechanism generally shown as reference number 26.

As shown in FIG. 6, the left side wall 34 and right side wall (removed to reveal the components within the closed housing) define a space 42 within the housing 22. The housing 22 is filled with a damping liquid 44 (shown diagrammatically in FIG. 5) so that the number of oscillations of the level-seeking mechanism 26 will be minimized if boat vibrations set the level seeking mechanism 26 in motion. Preferably the damping liquid 44 is a nonfreezing liquid such as ethylene glycol or methyl alcohol.

FIG. 6 shows the level-seeking mechanism 26 disposed within the housing 22 of the trim position indicator 20. The level-seeking mechanism 26 consists of a cylindrical pivot ring or sleeve 50, to the outer surface of which are fixedly attached an elongated pointer 52, a counterbalance weight 54, and positioning means 56. The pivot ring 50 of the level-seeking mechanism has a hole passing through the center of it so that the level-seeking mechanism 26 can be mounted on the pivot pin 24. The pivot ring is thus in the shape of a collar or a sleeve.

As shown in FIG. 6, the horizontal pivot pin 24 is disposed within the closed housing 22 (the right side wall has been removed to facilitate showing the interior components) and extends from the left side wall 34 to the right side wall 36 (removed). The first end 46 of the horizontal pivot pin 24 is attached to the right side wall 36, and the second end 48 of the horizontal pivot pin 24 is attached to the left side wall 34.

There are two ways in which the level-seeking mechanism 26 and the horizontal pivot pin 24 can be connected for disposing the level-seeking mechanism/horizontal pivot pin combination in the housing 22 of the trim position indicator 20. In the first and preferred way, the first end 46 of the horizontal pivot pin 24 is rotatably attached to the right side wall 36, and the second end 48 of the horizontal pivot pin 24 is rotatably attached to the left side wall 34. Thus, the pivot pin 24 is rotatably supported in the housing 22 of the trim position indicator 20. The level-seeking mechanism 26 is then fixedly mounted on the pivot pin 24, the pivot pin 24 extending through the hole in the center of the pivot ring 50 of the level-seeking mechanism. Thus, in this first way, the pivot pin 24 and the level-seeking mechanism 26 are essentially of one piece construction.

In the second and lesser preferred way of connecting the level-seeking mechanism 26 to the pivot pin 24, the first end 46 of the horizontal pivot pin 24 is fixedly attached to the right side wall 36, and the second end 48 of the horizontal pivot pin 24 is fixedly attached to the left side wall 34. Thus, the pivot pin 24 is fixedly supported in the housing 22 of the trim position indicator 20. The level-seeking mechanism 26 is then rotatably mounted on the pivot pin 24, the pivot pin 24 extending through the hole in the center of the pivot ring 50 of the level-seeking mechanism 26.

In both the first and second of these ways, the level-seeking mechanism 26 is viewable through the clear transparent viewing window 40.

The pivot ring 50, therefore, provides a base to which are fixedly attached an elongated pointer 52, a counterbalance weight 54, and positioning means 56.

The elongated pointer 52 has a face end 58 and an attachment end 60. The attachment end 60 of the elongated pointer 52 is attached to the pivot ring 50 and projects radially outward therefrom in the direction of the viewing window 40. Preferably, the elongated pointer 52 is hollow and filled with air or a light inert gas or is made of a lightweight material.

The counterbalance weight 54 is attached to the pivot ring 50 at a point approximately 180 degrees of arc from the attachment end 60 of the elongated pointer 52 and extends radially outward therefrom in a direction approximately 180 degrees of arc from the direction in which the face end 58 of the elongated pointer 52 is pointing. The weight and length of the counterbalance weight are selected to be such that the moment of the counterbalance weight 54 about the axis of the pivot pin 24 will be equal to the moment of the elongated pointer 52 about the axis of the pivot pin 24. Thus the counterbalance weight 54 balances the elongated pointer 52, and tends to keep the elongated pointer 52 in a horizontal orientation.

The counterbalance weight 54 has a moment substantially equal to the moment of the elongated pointer 52. The counterbalance weight 54 is attached to the pivot ring 50 at a point approximately 180 degrees of arc from the attachment end 60 of the elongated pointer 52 and extends radially outward therefrom in a direction approximately 180 degrees of arc from the direction in which the face end 58 of the elongated pointer 52 is pointing. This counterbalance weight 54 tends to keep the elongated pointer 52 in a horizontal orientation.

The positioning means 56 is attached to the pivot ring 50. The positioning means 56 helps to maintain the elongated pointer 52 and the counterbalance weight 54 in a horizontal orientation. For this embodiment, the positioning means 56 is a lightweight float 90 fixedly attached to an elongated float arm 92 which in turn is fixedly attached to a point on the outer circumference of the pivot ring 50 which is approximately 90 degrees of arc from the attachment point of the elongated pointer 52 and the attachment point of the counterbalance weight 54. The lightweight float 90 is either made of a lightweight material with a specific gravity less than the specific gravity of the damping liquid 44 or is hollow and filled with air or a light inert gas which causes the lightweight float 90 to tend to rise toward the top wall 30 of the closed housing 22. The damping liquid 44 is chosen so that its specific gravity is greater than the specific gravity of the lightweight float 90. Preferably, the moments of the elongated pointer 52 and the counterbalance weight 54 about the pivot pin (these two moments are equal to each other) are sufficiently larger than the moment of the positioning means about the pivot pin that the time for the level-seeking mechanism 26 to come to rest after having been set in motion is minimized.

In order to keep the level-seeking mechanism 26 from banging around in the housing 22 during transport of the trim position indicator 20 or the boat's outboard motor 88 to which it has been affixed, a level-seeking mechanism pivot stop 64 is fixedly attached to the interior of the housing 22. Preferably, as shown in FIG. 6, the first end 80 of the level-seeking mechanism pivot stop 64 is fixedly attached to the left side wall 34, and the second end 82 of the pivot stop 64 is fixedly attached to the right side wall 36 (removed). Preferably, this pivot stop 64 is located approximately on the line 83 which is equidistant from the positioning means 56 and the counterbalance weight 54 and is close enough to the pivot ring 50 (thus also being relatively close enough to the positioning means 56 and the counterbalance weight 54) to restrict the degree of movement of the level-seeking mechanism 26 to about 30 degrees of arc about the pivot stop 64.

The level-seeking mechanism 26 is so disposed within the closed housing 22 that the face end 58 of the elongated pointer 52 is adjacent the clear transparent viewing window 40 and can be easily seen through the window 40.

The clear transparent viewing window 40 has two indicator markings 66, 66 on it. The distance between these two markings 66, 66 is equal to the width of the face end 58 of the elongated pointer 52. Preferably, the face end 58 of the elongated pointer 52 and the indicator markings 66, 66 are luminescent or fluorescent, so that the face end 58 and the indicator markings 66, 66 may be easily viewed in poorly lit surroundings.

An alternate version of this embodiment has a second clear transparent viewing window 41 in the top wall 30 of the closed housing 22. (FIGS. 5 and 6 actually show this alternate version.) In this alternate version, the second clear transparent viewing window 41 is arcuate in shape, arching upward from the top wall 30. Consequently, in this alternate version, the lightweight float 90 can be seen from the front, side, and top of the trim position indicator 20, and the lightweight float 90 serves as a second pointer. On the second clear transparent viewing window 41 there are two spaced indicator markings 66, 66 separated from one another by a distance equal to the diameter of the lightweight float 90. With this version, one can keep one's eye on either the face end 58 of the elongated pointer 52 behind the first clear transparent viewing window 40 or on the lightweight float 90 behind the second clear transparent viewing window 41 as one tilts the outboard motor 88. One would then tilt the outboard motor 88 until one either sees the face end 58 of the elongated pointer 52 centered between the indicator markings 66, 66 on the first clear transparent viewing window 40 or until one sees the lightweight float 90 centered between the indicator markings 66, 66 on the second clear transparent viewing window 41.

The attachment means 28 (shown in FIG. 5) facilitates attaching the trim position indicator 20 to either the left side 84 or the right side 86 of the outboard motor's top cover 68. Preferably, the attachment means 28 is a strip of strong two-sided foam adhesive 70 attached to either the exterior surface 72 of the left side wall 34 or to the exterior surface 74 of the right side wall 36 of the trim position indicator 20.

Thus the face end 58 of the elongated pointer 52 is viewable through the clear transparent viewing window 40 from a position in front of the outboard motor 88. Preferably, a pair of light shields 76, 76 is so disposed within the housing 22 (as shown by FIG. 6) that when the level-seeking mechanism 26 is viewed through the clear transparent viewing window 40, the pair of light shields 76, 76 hides (from the boat operator's view) all of the level-seeking mechanism 26 except for the face end 58 of the elongated pointer 52. As shown in FIG. 6, the light shields form a sideways V with its vertex clipped off. The wide opening of the sideways V is adjacent to and as wide as the long dimension of the clear transparent viewing window 40 and the clipped off vertex of the sideways V is in the vicinity of the pivot ring 50. The elongated pointer 52 protrudes through the clipped off vertex of the sideways V formed by the two light shields 76, 76 and extends toward the clear transparent viewing window 40. Thus the two light shields 76, 76 essentially straddle the elongated pointer 52 being far apart from each other near the face end 58 of the elongated pointer 52 and being close together near the attachment end 60. The light shields thus effectively hide the positioning means 56 and the counterbalance weight 54 from the boat operator's view. This makes it much easier to distinguish the face end 58 of the elongated pointer 52 when one looks at it through the clear transparent viewing window 40. The navigator need merely adjust the tilt angle of the outboard motor 88 until the face end 58 of the elongated pointer 52 is centered between the two indicator markings 66, 66 on the face of its clear transparent viewing window 40.

5.4 Detailed Description of the Means Used in Calibrating the Trim Position Indicator As shown in FIG. 7, for an outboard motor 88 without a hydrofoil stabilizer 100 attached to the antiventilation plate 98, a line level 122 can be initially placed directly on the upper surface 102 of the antiventilation plate 98 in an orientation parallel to the axis 120 of the propeller shaft. Then the outboard motor 88 is tilted until the line level 122 indicates that level has been obtained. Then the trim position indicator 20 is held vertically and such that the face of its elongated pointer 58 is centered between the two markings 66, 66 on the face of its clear transparent viewing window 40. The trim position indicator 20 is then brought near to the spot on the side (84 or 86) of the top cover 68 of the outboard motor where it is to be attached. The trim position indicator is then turned so that its clear transparent viewing window 40 is facing in the same direction as the front of the outboard motor. (Then the clear transparent viewing window of the trim position indicator will be easily viewable from a position inside the boat.) Next, the backing paper is peeled off the adhesive material 70 on the side of the trim position indicator 20. Then the trim position indicator 20 is pressed onto the side of the top cover 68 of the outboard motor.

Figure 8:
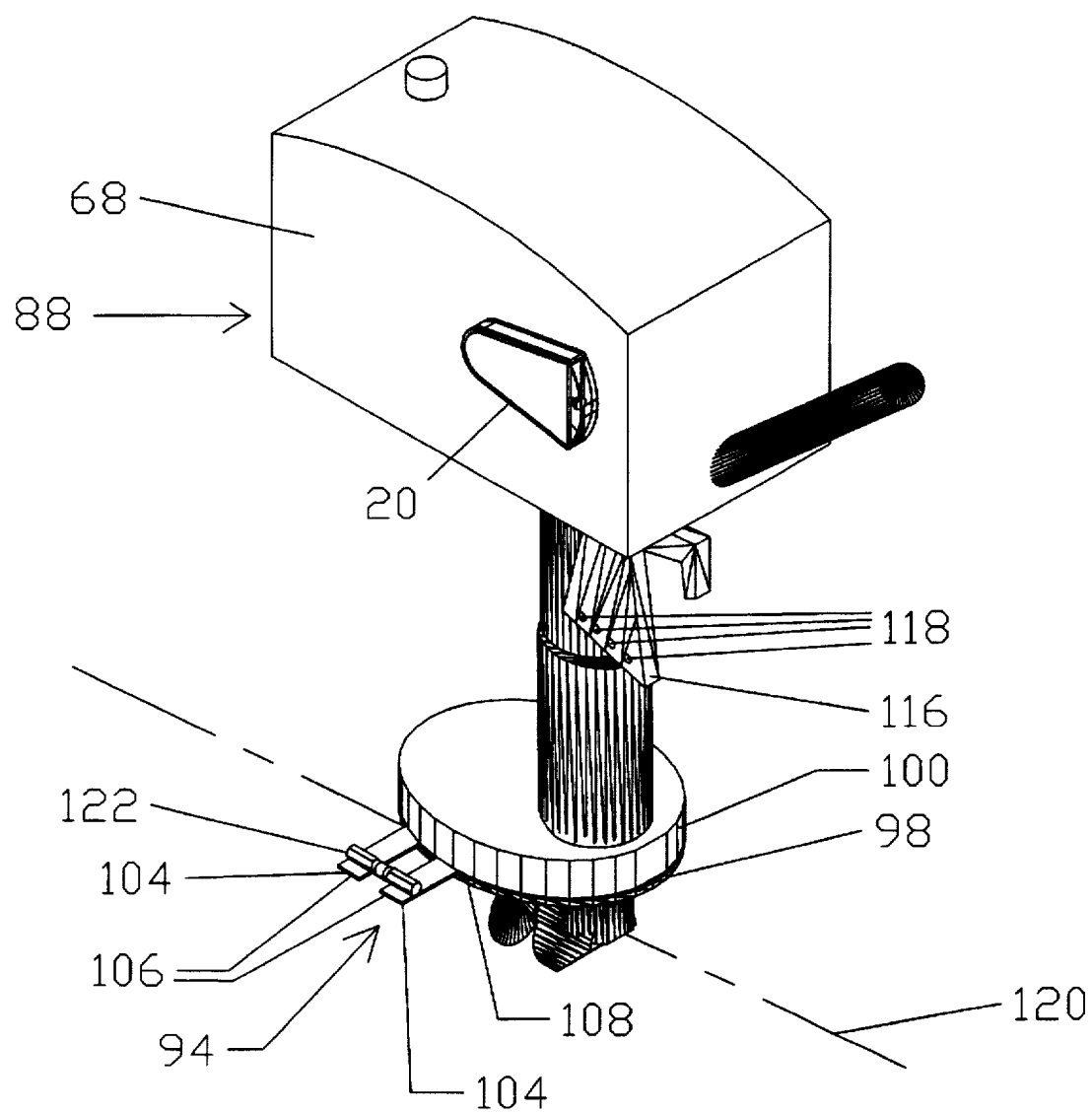
FIG. 8 shows a diagrammatic perspective view of the preferred embodiment mounted on a boat's outboard motor which has a hydrofoil stabilizer attached to the antiventilation plate.

As shown in FIG. 8, the antiventilation plate 98 can be extended to provide a support for a line level 122 so that the trim position indicator 20 may be used with a boat's outboard motor 88 which has a hydrofoil stabilizer (diagrammatically shown as reference number 100) attached to the upper surface of its antiventilation plate 98.

As shown in FIG. 8, on boat's outboard motors where there is sufficient clearance between the antiventilation plate 98 and the hydrofoil stabilizer 100, the preferred means for extending the antiventilation plate 94 is one or two thin rectangular tabs of a sturdy material such as metal or plastic. These tabs are referred to as extension tabs in this specification and are shown as reference number 104. The extension tabs 104 are inserted in the small clearance 108 between the antiventilation plate 98 and the hydrofoil stabilizer 100. Thus, a support surface 106 is provided for the line level 122 used in calibration to be placed thereon.

Figure 9:
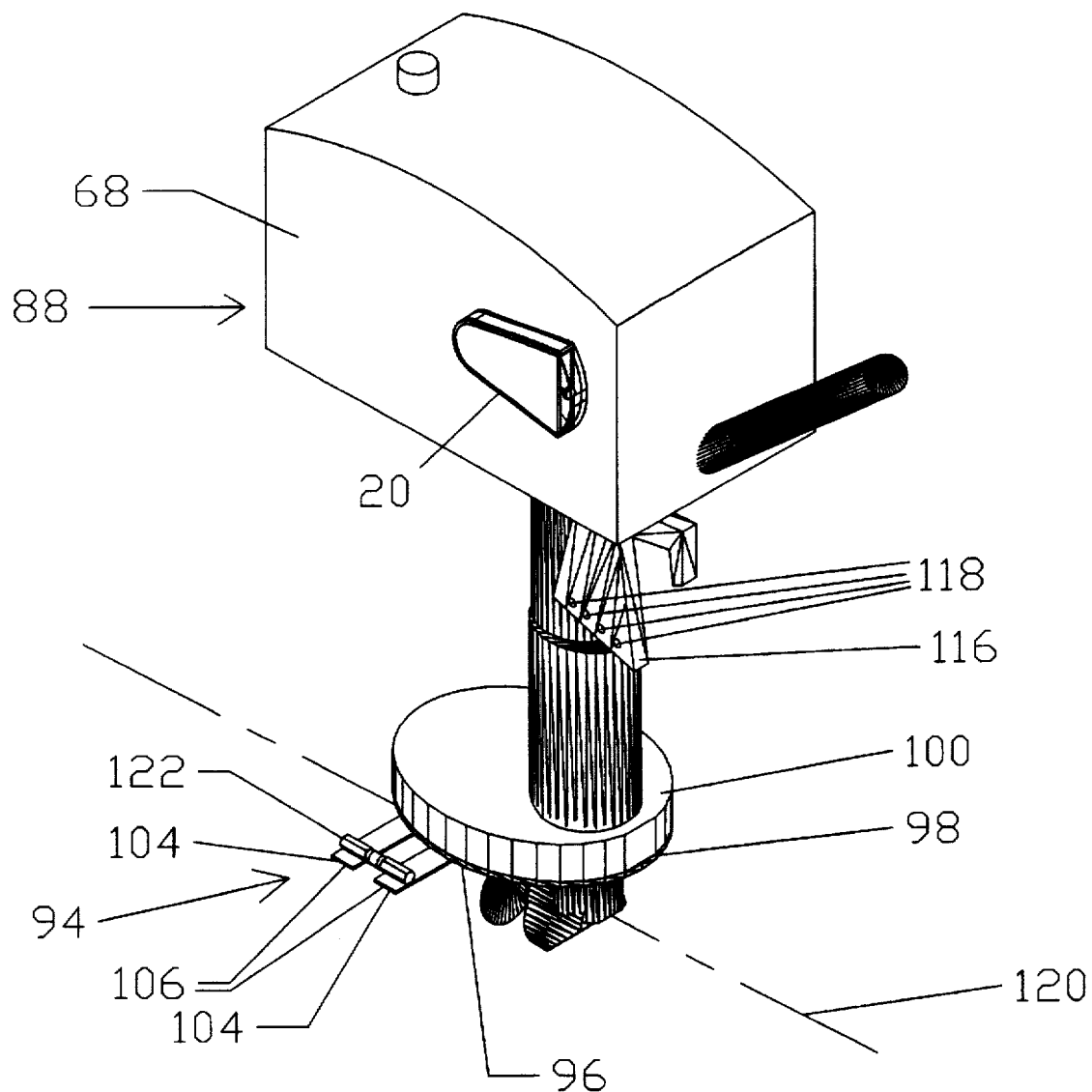
FIG. 9 shows another diagrammatic perspective view of the preferred embodiment mounted on a boat's outboard motor which has a hydrofoil stabilizer attached to the antiventilation plate.
Figure 10:
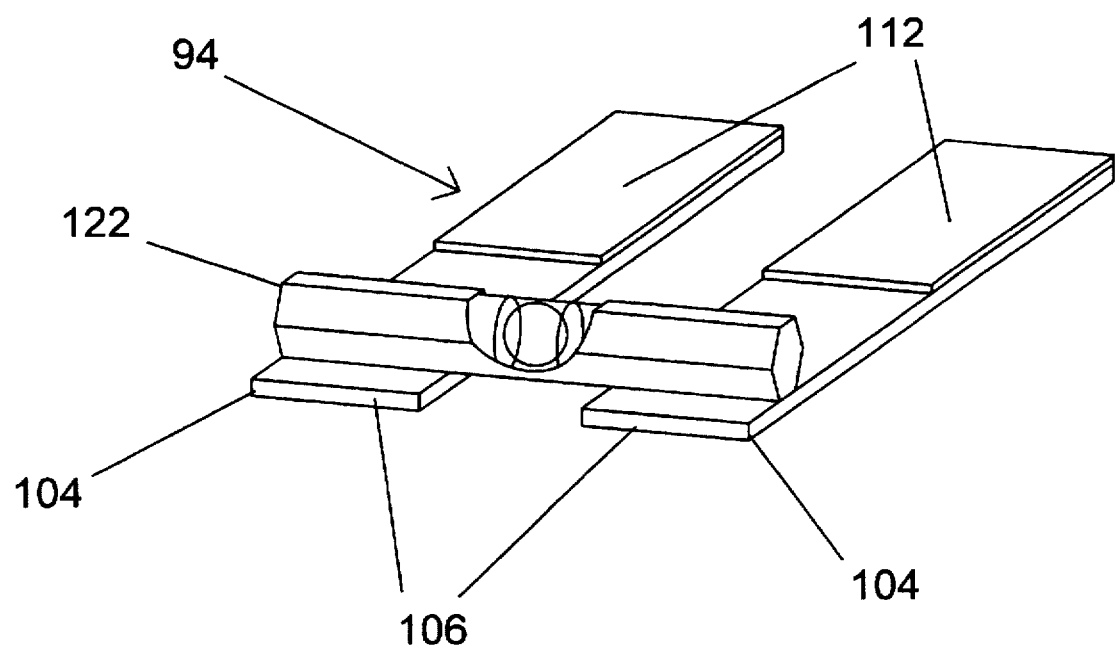
FIG. 10 shows a diagrammatic perspective view of a line level sitting on extension tabs to which are attached pieces of double-sided sticky tape.

As shown in FIG. 9, in those cases where there is insufficient clearance between the antiventilation plate 98 and the hydrofoil stabilizer 100 for extension tabs 104 to be inserted, the preferred means for extending the antiventilation plate 94 is two extension tabs 104 each having a piece of two-sided sticky tape 112 (better seen in FIG. 10) attached to a portion thereof. When the two-sided sticky tape portions of the extension tabs 104 are pressed against the under surface of the antiventilation plate 98, a support surface 106 is provided for the a line level 122.

Figure 11:
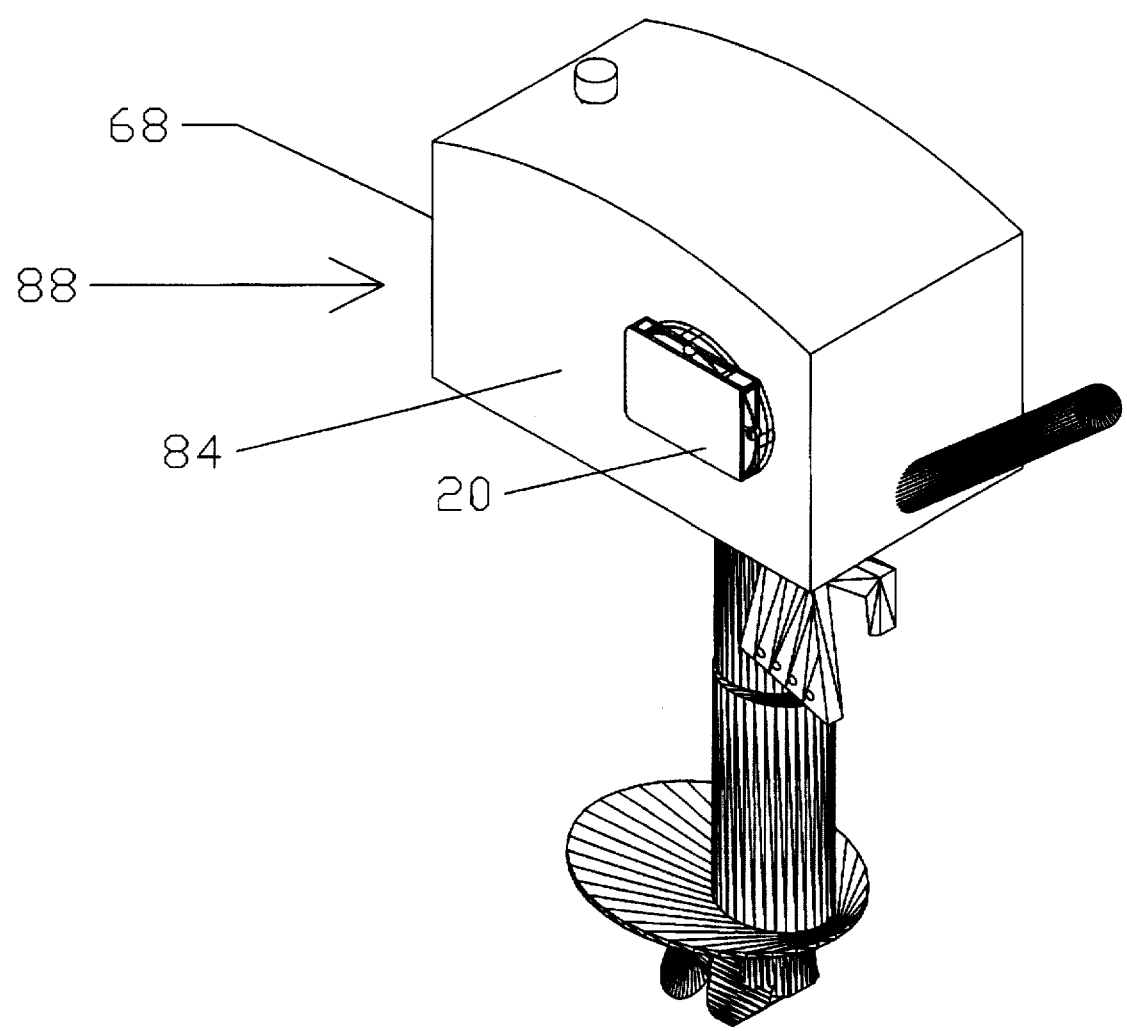
FIG. 11 shows a diagrammatic perspective view of the non-preferred embodiment mounted on a boat's outboard motor which does not have a hydrofoil stabilizer attached to the antiventilation plate.

FIG. 11 shows the non-preferred embodiment of the trim position indicator 20 mounted on the top cover 68 of an outboard motor 88 not having a hydrofoil stabilizer 100 attached to its antiventilation plate 98.

5.5 Method of Using the Trim Position Indicator 5.5.1 General Method of Mounting the Trim Position Indicator on the Left or Right Side of the Motor's Top Cover to Provide an Indication of the Outboard Motor's Tilt Angle So That the Tilt Angle Can Be Adjusted for Optimal Performance (For Boat Motors Not Having a Hydrofoil Stabilizer Attached to the Upper Surface of the Antiventilation Plate)

(a) As shown in FIG. 7, place a line level 122 on the upper surface 102 of the antiventilation plate 98 in a position which is parallel to the axis of the propeller shaft 120.

(b) Tilt the outboard motor 88 until the line level 122 indicates that a level condition has been achieved.

(c) Orient the trim position indicator 20 such that its left and right side walls 34, 36 are substantially vertical, and its top wall 30 is as high as the left and right side walls 34, 36, and tilt the trim position indicator 20 until the face end 58 of the elongated pointer 52 is centered between the two indicator markings 66, 66.

(d) affix the oriented trim position indicator of step (c) to the side of the top cover 68 of the outboard motor 88 in a location where its clear transparent viewing window will be easily viewable from a position inside the boat.

5.5.2 General Method of Mounting the Trim Position Indicator on the Left or Right Side of the Motor's top cover to Provide an Indication of Tilt Angle So That the Tilt Angle Can Be Adjusted for Optimal Performance (For Boat Motors Having a Hydrofoil Stabilizer Attached to the Upper Surface of the Antiventilation Plate)

(a) As shown in FIG. 8, insert two extension tabs 104 between the antiventilation plate 98 and the hydrofoil stabilizer 100 so as to provide a support surface 106 for a line level 122. (Alternatively as shown in FIG. 9, two extension tabs 104 having pieces of two-sided sticky tape 112 attached to a portion of them can be attached to the lower surface 96 of the antiventilation plate 98 in order to provide a support surface 106 for a line level 122.)

(b) Place a line level 122 on the support surface 106 in a position which is parallel to the axis of the propeller shaft 120.

(c) Tilt the outboard motor 88 until the line level 122 indicates that a level condition has been achieved.

(d) Orient the trim position indicator 20 such that its left and right side walls 34, 36 are substantially vertical, and its top wall 30 is as high as the left and right side walls 34, 36, and tilt the trim position indicator 20 until the face end 58 of the elongated pointer 52 is centered between the two indicator markings 66, 66 on the clear transparent viewing window 40.

(e) Affix the oriented trim position indicator of step (d) to the side of the top cover 68 of the outboard motor 88 in a location where its clear transparent viewing window will be easily viewable from a position inside the boat.

5.5.3 Specific Method of Mounting the Trim Position Indicator on the Side of the Motor's top cover to Provide an Indication of the Outboard Motor's Tilt Angle So That the Tilt Angle Can Be Adjusted for Optimal Performance 5.5.3.1 Case 1: When the Motor is not Attached to a Boat (a) Use the mounting clamps of the outboard motor 88 to attach the outboard motor 88 to a fixed mounting platform such as an outboard motor mounting stand, a workbench, a saw horse, or the like.

(b) For outboard motors 88 not having a hydrofoil stabilizer 100: Place a line level 122 on the upper surface 102 of the antiventilation plate 98 at an orientation parallel to the axis 120 of the propeller shaft. (By placing the line level 122 on the antiventilation plate 98 as close as possible to the side of the lower outboard motor leg, one can usually be assured that the line level 122 is aligned with the axis 120 of the propeller shaft inasmuch as the wall of the lower outboard motor leg is usually parallel to the axis 120 of the propeller shaft.)

For outboard motors having a hydrofoil stabilizer 100 attached to the antiventilation plate 98: Attach means for extending the antiventilation plate 94 to the antiventilation plate 98 so as to provide a support surface 106 for a line level 122.

On boat's outboard motors where there is sufficient clearance between the antiventilation plate 98 and the hydrofoil stabilizer 100 (Please see FIG. 8), the preferred means for extending the antiventilation plate 94 is one or two thin rectangular tabs of a sturdy material such as metal or plastic. These tabs are shown by reference number 104 and will be referred to as extension tabs. Insert these extension tabs 104 in the small clearance 108 between the antiventilation plate 98 and the hydrofoil stabilizer 100. Thus, a support surface 106 is provided for a line level 122 to be placed thereon prior to performing the next step (step (c) below).

In those cases where there is insufficient clearance between the antiventilation plate 98 and the hydrofoil stabilizer 100 for extension tabs 104 to be inserted (FIG. 9), the preferred means for extending the antiventilation plate 94 is one or two extension tabs 104 each having a piece of two-sided sticky tape 112 (best shown in FIG. 10) attached to a portion thereof. Then the two-sided sticky tape covered portion of the extension tab 104 is pressed against the under surface 96 of the antiventilation plate 98, thus providing a support surface 106 for a line level 122. Now place the line level 122 on the support surface 106 at an orientation parallel to the axis 120 of the propeller shaft.

(c) Tilt the boat's outboard motor 88 until the line level 122 indicates level. This is done by first performing a coarse tilt angle adjustment and then a fine tilt angle adjustment. Perform the coarse tilt angle adjustment as follows: Release the outboard motor's tilt angle adjustment lock, and move the outboard motor's trim angle adjuster 118 (shown diagrammatically in FIG. 9) positive or negative (up or down) (thus varying the tilt of the boat's outboard motor) until, as close as possible, the line level 122 indicates level. The fine tilt angle adjustment can be performed by placing a sufficient number of thin shims under one side or the other of the outboard motor mounting stand or workbench being used to support the outboard motor in order to cause the line level 122 to indicate exactly level.

(d) Secure the outboard motor 88 so that the angle does not change while performing the following steps.

(e) Remove all dirt, wax, and grease from the portion of the outboard motor cover 68 where the trim position indicator 20 is to be placed. It is recommended that the trim position indicator be placed on the side of the outboard motor's top cover in a location where its clear transparent viewing window will be easily viewable from a position inside the boat. Now holding the trim position indicator 20 so that it indicates level, peel the backing paper off the outward-facing surface of the strong two-sided foam adhesive 70 on the side of the trim position indicator 20, and press the trim position indicator 20 against the side of the top cover (84 or 86) of the tilted outboard motor.

5.5.3.2 Case 2: When the Motor is Attached to a Boat (a) With the boat on its trailer, lower the swivel jack, or place the front of the trailer on a jack stand or block of wood.

(b) For outboard motors 88 not having a hydrofoil stabilizer 100: Place a line level 122 on the upper surface 102 of the antiventilation plate 98 at an orientation parallel to the axis 120 of the propeller shaft. (By placing the line level 122 on the antiventilation plate 98 as close as possible to the side of the lower outboard motor leg, one can usually be assured that the line level 122 is aligned with the axis 120 of the propeller shaft inasmuch as the wall of the lower outboard motor leg is usually parallel to the axis 120 of the propeller shaft.)

For outboard motors having a hydrofoil stabilizer 100 attached to the antiventilation plate 98: Attach means for extending the antiventilation plate 94 to the antiventilation plate 98 so as to provide a support surface 106 for the level 122.

On boat's outboard motors where there is sufficient clearance between the antiventilation plate 98 and the hydrofoil stabilizer 100 (FIG. 9), the preferred means for extending the antiventilation plate 94 is one or two extension tabs 104 of a sturdy material such as metal or plastic. Insert these extension tabs 104 in the small clearance 108 between the antiventilation plate 98 and the hydrofoil stabilizer 100. Thus, a support surface 106 is provided for the line level 122 to be placed thereon prior to performing the next step (step (c) below).

In those cases where there is insufficient clearance between the antiventilation plate 98 and the hydrofoil stabilizer 100 for extension tabs to be inserted (FIG. 9), the preferred means for extending the antiventilation plate 94 is one or two extension tabs 104 each having a piece of two-sided sticky tape 112 (best shown in FIG. 10) attached to a portion thereof. Then the two-sided sticky tape covered portion of the extension tab 104 is pressed against the under surface 96 of the antiventilation plate 98, thus providing a support surface 106 for a line level 122. Now place a line level 122 on the support surface 106 at an orientation parallel to the axis 120 of the propeller shaft.

(c) Tilt the boat's outboard motor 88 until the line level 122 indicates level. This is done by first performing a coarse tilt angle adjustment and then a fine tilt angle adjustment. Perform the coarse tilt angle adjustment as follows: Release the outboard motor's trim angle adjustment lock, and move the outboard motor's trim angle adjuster 118 (also known as the tilt pin adjustment) positive or negative (up or down) (thus varying the tilt of the boat's outboard motor) until the line level 122 is as close as possible to indicating a level condition. The fine tilt angle adjustment is performed by raising or lowering the trailer's swivel jack until the line level 122 exactly indicates level.

(d) Secure the outboard motor 88 so that the angle does not change while performing the following steps.

(e) Remove all dirt, wax, and grease from the portion of the outboard motor's top cover 68 where the trim position indicator 20 is to be placed. It is recommended that the trim position indicator 20 be placed high up on the side of the outboard motor's top cover 68 in a location where its clear transparent viewing window will be easily viewable from a position inside the boat. Now holding the trim position indicator 20 so that it indicates level, peel the backing paper off the outward-facing surface of the strong two-sided foam adhesive 70 on the side of the trim position indicator 20, and press the trim position indicator 20 against the side of the top cover 68 of the tilted outboard motor.

5.5.4 The Most Accurate Method for Calibrating the Trim Position Indicator

The following method is somewhat more work but it is the most accurate method of calibrating the trim position indicator. It is applicable to boat's outboard motors both with and without hydrofoil stabilizers attached to their antiventilation plates. The steps are as follows:

(a) Remove the propeller from the propeller shaft.

(b) Determine by visual inspection whether or not the propeller shaft is tapered. Do not use this method of calibration if the shaft is tapered; only use this method if the propeller shaft is a straight shaft.

(c) Place the line level directly upon the propeller shaft. Now adjust the tilt angle of the outboard motor until the line level indicates level. The bubble of the line level should be directly between the two indicator lines on the line level.

(d) After properly preparing the mounting surface, remove the backing paper from the adhesive foam, and place the trim position indicator onto the side of the outboard motor's top cover in a location where its clear transparent viewing window will be easily viewable from a position inside the boat. Be careful to ensure that the trim position indicator indicates level when the installation is complete.

5.5.5 Method of Using the Trim Position Indicator in the Trimming of a Boat 5.5.5.1 Low Speed Operation Adjust the tilt angle of the outboard motor so that the trim position indicator shows a level reading. While underway and only if conditions permit viewing the trim position indicator, observe the trim position indicator. The trim position indicator's elongated pointer's face should be within the two indicator markings; if not, adjust the outboard motor's tilt angle until a level reading is obtained.

5.5.5.2 High Speed Operation

When adjusting for high speed operation, the best performance is attained by tilting the outboard motor so that the antiventilation plate is parallel to the water's surface. This will be evident when the trim position indicator's elongated pointer's face is within the two indicator markings. If not, adjust the outboard motor's tilt angle until a level reading is obtained.

The addition of a hydrofoil stabilizer on the outboard motor, or the use of trim tabs on the boat will help to keep the bow of the boat down. One may also solve the problem of a poorly trimmed boat by distributing the weight more evenly about the boat.

One can now mark the trim positions for high and low speed operation. However, if the boat is loaded differently the next time out, or the number of passengers is increased or decreased, the settings will change. This is not a real problem since one can now tell by a glance at the trim position indicator if the tilt angle requires readjustment in order to restore peak performance.

5.6 Advantages of the Invention

The previously described versions of the present invention have many advantages, including:

Due to increased performance, there is a large fuel saving. When the propeller is properly trimmed, the outboard motor is operating at peak efficiency.

Due to the ability to establish the proper outboard motor trim, propeller slippage can be virtually eliminated. An untrimmed propeller has a compressed and turbulent path in the water. Its inefficient motion results in a high degree of slippage. An outboard motor equipped with a 12 inch pitch propeller should propel the boat forward 12 inches with each revolution of the propeller. Under the conditions of poor trim, if the boat is propelled only 9 inches with each revolution of the propeller, this is a slippage of 25 percent.

Rooster tail and bow hop are virtually eliminated, thus giving the boat passengers a more pleasurable enjoyable ride.

Since the trim position indicator does not require a source of electric power to operate, smaller boats without electric power can now be properly trimmed with tremendous fuel saving, and a much more pleasurable, smoother ride.

The trim position indicator described in this specification is viewable from either a standing or a seated position in front of the outboard motor. Thus, the operator is no longer required to stand over the trim position indicator to view its reading as is the case when using the trim position indicator of First Applicant's U.S. Pat. No. 5,584,731.

The trim position indicator described in this specification is much more economical to manufacture than the trim position indicator of First Applicant's U.S. Pat. No. 5,584,731. The cost of making the molds to make the curved tubing for the trim position indicator of U.S. Pat. No. 5,584,731 was prohibitively high.

For that version of Applicants' trim position indicator which uses an elongated thin rectangularly shaped anchor weight, there are further advantages:

(a) A damping liquid need not be used to damp out any oscillatory motion of the level seeking mechanism. This not only reduces cost of manufacture but also eliminates any concern about leakage. Further, the resulting lighter weight of the trim position indicator makes it less likely that the trim position indicator will eventually work its way loose from the motor's top cover and fall into the sea.

(b) When a damping liquid is used, there may be a slight loss of visibility of the face of the pointer. Not using a damping liquid may result in increased visibility of the pointer face.

(c) Testing can be performed to determine the exact dimensions of the elongated thin rectangularly shaped anchor weight required for the best mix of: sensitivity of the trim position indicator to changes of motor trim, and minimization of the time to damp out oscillations of the level-seeking mechanism.

5.7 LIST OF REFERENCE NUMBERS 20 trim position indicator
22 closed hollow housing
24 horizontal pivot pin
26 level-seeking mechanism
28 attachment means
30 top wall of closed hollow housing
32 front wall of closed hollow housing
34 left side wall of closed hollow housing
36 right side wall of closed hollow housing
38 bottom wall of closed hollow housing
40 clear transparent viewing window
41 second clear transparent viewing window
42 space within the housing
44 damping liquid
46 first end of the horizontal pivot pin
48 second end of the horizontal pivot pin
50 pivot ring or sleeve
52 elongated pointer
54 counterbalance weight
56 positioning means
58 face end of elongated pointer
60 attachment end of elongated pointer
62 anchor weight
64 level-seeking mechanism pivot stop
66 indicator marking
68 outboard motor's top cover
70 strip of strong two-sided foam adhesive
72 exterior surface of the left side wall
74 exterior surface of the right side wall
76 light shield
80 first end of level-seeking mechanism pivot stop
82 second end of level-seeking mechanism pivot stop
83 line equidistant from the positioning means and the counterbalance weight
84 left side of outboard motor top cover
86 right side of outboard motor top cover
88 outboard motor
90 lightweight float
92 elongated float arm
94 means for extending the antiventilation plate
96 under surface of the antiventilation plate
98 antiventilation plate
100 hydrofoil stabilizer
102 upper surface of antiventilation plate
104 thin rectangular plate or tab (Referred to as an extension tab in the specification)
106 support surface
108 small clearance between antiventilation plate and hydrofoil stabilizer
110 (unused)
112 two-sided sticky tape
114 (unused)
116 outboard motor's stern bracket
118 outboard motor's tilt pin adjuster (trim angle
118 outboard motor's tilt pin adjuster (trim angle adjuster)
120 axis of the propeller shaft
122 line level
124 elongated thin rectangularly shaped anchor weight
126 elongated thin rectangularly shaped strip of lightweight rigid material It will be understood that each of the elements described above, or two or more together may also find a useful application in other types of devices and methods differing from those types described above.

5.8 Alternatives and the Closing

Thus the reader will see that our multiposition readable trim position indicator supplies a long felt need for a simple, economical, and easy to use device which can indicate the relative position of the outboard motor's antiventilation plate with respect to the water's surface, thus indicating when the trim of the outboard motor requires adjustment for maximum performance. If one should aver that our trim position indicator and the methods of installing and using it are obvious, then one is hard put to explain why all the small boat owners have decided not to install such a device on their boat's outboard motors, and have decided to continue to endure such phenomena as porpoising, bow hop, and cavitation with resulting fuel wastage, poor boat handling, and poor performance. As it is, the small boat owner has no means whatsoever of indicating that his boat is properly trimmed, and the market place currently has nothing to offer.

Although the present invention has been described in considerable detail with reference to certain preferred versions thereof, other versions are possible which will be apparent to those who are skilled in the art. Thus, while certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Therefore, the spirit and scope of the appended claims should not be limited to the description of the preferred versions contained herein, but by the appended claims and their legal equivalents.

We claim:

1. A trim position indicator for attachment to either the left or right side of the top cover of an outboard motor, said trim position indicator comprising:
   (a) a closed housing having a top wall, a front wall having a transparent viewing window, a left side wall, and a right side wall, said walls defining a space within said housing;
   (b) a horizontal pivot pin having a cross-section having a predetermined circumference and having a first end and a second end, said pivot pin being disposed within said closed housing and extending from the left side wall to the right side wall, said first end of said horizontal pivot pin being attached to said right side wall, and said second end of said horizontal pivot pin being attached to said left side wall;
   (c) a level-seeking mechanism mounted on said pivot pin, said level-seeking mechanism being viewable through said transparent viewing window, said level-seeking mechanism comprising:
      (i) a pivot ring having a hole passing therethrough, said pivot pin extending through said hole in said pivot ring, whereby said pivot ring is supported by said pivot pin;
      (ii) an elongated pointer having a predetermined moment, said elongated pointer having a face end having a width and an attachment end, said attachment end of said elongated pointer being attached to said pivot ring, said elongated pointer projecting radially outward therefrom in the direction of said viewing window;
      (iii) a counterbalance weight having a moment substantially equal to the moment of said elongated pointer, said counterbalance weight being fixedly attached to said pivot ring at a point approximately 180 degrees of arc from the attachment end of said elongated pointer and extending radially outward therefrom in a direction approximately 180 degrees of arc from the direction of the elongated pointer, whereby said counterbalance weight tends to keep said elongated pointer in a horizontal orientation; and
      (iv) positioning means fixedly attached to said pivot ring, said positioning means helping to maintain said elongated pointer in a horizontal orientation;
   said level-seeking mechanism being so disposed within said closed housing that said face end of said elongated pointer is adjacent said transparent viewing window and is viewable therethrough; and
   (d) attachment means for attaching said trim position indicator to either the left side or the right side of the outboard motor's top cover;
whereby said face end of said elongated pointer is viewable through the transparent viewing window from a position in front of said outboard motor.

2. The trim position indicator as recited in claim 1, further comprising a damping liquid filling said closed housing.

3. The trim position indicator as recited in claim 2, wherein:
   (a) said positioning means comprises a lightweight float fixedly connected to a point on the outer circumference of said pivot ring which is approximately 90 degrees of arc from both the elongated pointer and the counterbalance weight, said lightweight float tending to pull upward toward the top wall of said closed housing; and
   (b) the specific gravity of the damping liquid is greater than the specific gravity of the lightweight float.

4. The trim position indicator as recited in claim 3, wherein the top wall of said closed housing has an upward bowed transparent viewing window, whereby said lightweight float is viewable from a position above the trim position indicator and also from a position to the side of the trim position indicator.

5. The trim position indicator as recited in claim 1, wherein said positioning means comprises an anchor weight fixedly attached to a point on the outer circumference of said pivot ring which is approximately 90 degrees of arc from the elongated pointer and the counterbalance weight.

6. The trim position indicator as recited in claim 5, further comprising a damping liquid filling said closed housing, wherein the specific gravity of the damping liquid is less than the specific gravity of the anchor weight.

7. The trim position indicator as recited in claim 1, wherein said positioning means comprises an elongated thin rectangularly shaped anchor weight having a predetermined width and a predetermined length, said elongated thin rectangularly shaped anchor weight being fixedly attached to a point on the outer circumference of said pivot ring which is approximately 90 degrees of arc from both the elongated pointer and the counterbalance weight, said rectangularly shaped anchor weight acting as a fan to damp any oscillatory movement of the level-seeking mechanism.

8. The trim position indicator as recited in claim 7, wherein the width of the elongated thin rectangularly shaped anchor weight is just slightly less than the distance between the left side wall and the right side wall of the closed hollow housing, and the length of said anchor weight is slightly less than the distance between the pivot ring and the bottom wall of the closed hollow housing whereby air flow past the edges of the elongated thin rectangularly shaped anchor weight is greatly restricted and the damping effect of said anchor weight is greatly increased.

9. The trim position indicator as recited in claim 7, further comprising an elongated thin rectangularly shaped strip of rigid material fixedly attached to a point on the outer circumference of said pivot ring which is approximately 180 degrees of arc from the point at which the elongated thin rectangularly shaped anchor weight is attached to the pivot ring, said strip of rigid material acting as a fan in concert with said elongated thin rectangularly shaped anchor weight to damp any oscillatory movement of the level-seeking mechanism.

10. The trim position indicator as recited in claim 1, wherein said attachment means comprises a strip of two-sided foam adhesive attached to either the left or right side wall of the trim position indicator.

11. The trim position indicator as recited in claim 1, wherein said transparent viewing window has a plurality of indicator markings thereon, two of said markings being separated from one another by a distance substantially equal to the width of said face end of said elongated pointer.

12. The trim position indicator as recited in claim 1, wherein said first end of said horizontal pivot pin is fixedly attached to said right side wall, said second end of said horizontal pivot pin is fixedly attached to said left side wall, and said level-seeking mechanism is rotatably mounted on said pivot pin.

13. The trim position indicator as recited in claim 1, wherein said first end of said horizontal pivot pin is rotatably attached to said right side wall, said second end of said horizontal pivot pin is rotatably attached to said left side wall, and said level-seeking mechanism is fixedly mounted on said pivot pin, whereby said level-seeking mechanism is rotatably supported in said housing.

14. The trim position indicator as recited in claim 1, further comprising a light shield fixedly mounted therein, said light shield substantially hiding all of the level-seeking mechanism except for the face end of the elongated pointer.

15. The trim position indicator as recited in claim 1, further comprising a level-seeking mechanism pivot stop, whereby the range of motion of said level-seeking mechanism is restricted.

16. A method of mounting a trim position indicator on the left or right side of the outboard motor's top cover in order to provide an indication of tilt angle so that the tilt angle can be adjusted for optimal performance, said trim position indicator having (a) a closed housing having a top wall, a front wall comprising a transparent viewing window, said transparent viewing window having a plurality of indicator markings thereon, two of said markings being separated from one another by a distance substantially equal to the width of said face end, a left side wall, and a right side wall, said walls defining a space within said housing;

(b) a horizontal pivot pin having a cross-section having a predetermined circumference and having a first end and a second end, said pivot pin being disposed within said closed housing and extending from the left side wall to the right side wall, said first end of said horizontal pivot pin being attached to said right side wall, and said second end of said horizontal pivot pin being attached to said left side wall;

(c) a level-seeking mechanism mounted on said pivot pin, said level-seeking mechanism being viewable through said transparent viewing window, said level-seeking mechanism comprising:

(i) an elongated pointer having a face end and an attachment end, said attachment end of said elongated pointer being attached to said pivot ring and projecting radially outward therefrom in the direction of said viewing window;

(ii) a counterbalance weight attached to said pivot ring at a point approximately 180 degrees of arc from the attachment end of said elongated pointer and projecting radially outward therefrom in a direction approximately 180 degrees of arc from the direction of the elongated pointer; and (iii) positioning means attached to said pivot ring, said positioning means helping to maintain said elongated pointer in a horizontal orientation;

said level-seeking mechanism being so disposed within said closed housing that said face end of said elongated pointer is proximate said transparent viewing window and is viewable therethrough; and (d) attachment means for attaching said trim position indicator to either the left side or the right side of the outboard motor's top cover;

said outboard motor having an antiventilation plate having an upper surface and a lower surface, said method comprising the steps of:

(a) placing a line level on the upper surface of said antiventilation plate;

(b) tilting the outboard motor until said line level indicates that a level condition has been achieved;

(c) orienting said trim position indicator such that its left and right side walls are substantially vertical, and its top wall is as high as the left and right side walls, and tilting said trim position indicator until said face end is centered between two of said indicator markings;

(d) affixing said oriented trim position indicator of step (c) to side of said top cover of said outboard motor.

17. A method of mounting a trim position indicator on the left or right side of the outboard motor's top cover in order to provide an indication of tilt angle so that the tilt angle can be adjusted for optimal performance, said trim position indicator having (a) a closed housing having a top wall, a front wall comprising a transparent viewing window, said transparent viewing window having a plurality of indicator markings thereon, two of said markings being separated from one another by a distance substantially equal to the width of said face end, a left side wall, and a right side wall, said walls defining a space within said housing;

(b) a horizontal pivot pin having a cross-section having a predetermined circumference and having a first end and a second end, said pivot pin being disposed within said closed housing and extending from the left side wall to the right side wall, said first end of said horizontal pivot pin being attached to said right side wall and said second end of said horizontal pivot pin being attached to said left side wall;

(c) a level-seeking mechanism mounted on said pivot pin, said level-seeking mechanism being viewable through said transparent viewing window, said level-seeking mechanism comprising:

(i) an elongated pointer having a face end and an attachment end, said attachment end of said elongated pointer being attached to said pivot ring and projecting radially outward therefrom in the direction of said viewing window;

(ii) a counterbalance weight attached to said pivot ring at a point approximately 180 degrees of arc from the attachment end of said elongated pointer and extending radially outward therefrom in a direction approximately 180 degrees of arc from the direction of the elongated pointer; and (iii) positioning means attached to said pivot ring, said positioning means helping to maintain said elongated pointer in a horizontal orientation;

said level-seeking mechanism being so disposed within said closed housing that said face end of said elongated pointer is proximate said transparent viewing window and is viewable therethrough; and (d) attachment means for attaching said trim position indicator to either the left side or the right side of the outboard motor's top cover;

said outboard motor having an antiventilation plate having an upper surface and a lower surface, and a hydrofoil stabilizer attached to the upper surface of the antiventilation plate, said method comprising the steps of:

(a) attaching means for extending the antiventilation plate to said antiventilation plate so as to provide a support surface for a line level;

(b) placing a line level on said support surface;

(c) tilting the outboard motor until said line level indicates that a level condition has been achieved;

(d) orienting said trim position indicator such that its left and right side walls are substantially vertical, and its top wall is as high as the left and right side walls, and tilting said trim position indicator until said face end is centered between two of said indicator markings;

(e) affixing said oriented trim position indicator of step (d) to side of said top cover of said outboard motor.

18. The method of claim 17 wherein said means for extending the antiventilation plate is a thin tab for insertion between the antiventilation plate and the hydrofoil stabilizer, whereby said tab provides a surface for said line level to be placed thereon.

19. The method of claim 17 wherein said means for extending the antiventilation plate is a thin tab having a piece of two-sided sticky tape attached to a portion thereof so that the thin tab may be attached to the lower surface of the antiventilation plate, whereby said tab provides a surface for said line level to be placed thereon.

20. A method of mounting a trim position indicator on the left or right side of the outboard motor's top cover in order to provide an indication of tilt angle so that the tilt angle can be adjusted for optimal performance, said trim position indicator having (a) a closed housing having a top wall, a front wall comprising a transparent viewing window, said transparent viewing window having a plurality of indicator markings thereon, two of said markings being separated from one another by a distance substantially equal to the width of said face end, a left side wall, and a right side wall, said walls defining a space within said housing;

(b) a horizontal pivot pin having a cross-section having a predetermined circumference and having a first end and a second end, said pivot pin being disposed within said closed housing and extending from the left side wall to the right side wall, said first end of said horizontal pivot pin being attached to said right side wall, and said second end of said horizontal pivot pin being attached to said left side wall;

(c) a level-seeking mechanism mounted on said pivot pin, said level-seeking mechanism being viewable through said transparent viewing window, said level-seeking mechanism comprising:

(i) an elongated pointer having a face end and an attachment end, said attachment end of said elongated pointer being attached to said pivot ring and projecting radially outward therefrom in the direction of said viewing window;

(ii) a counterbalance weight attached to said pivot ring at a point approximately 180 degrees of arc from the attachment end of said elongated pointer and projecting radially outward therefrom in a direction approximately 180 degrees of arc from the direction of the elongated pointer; and (iii) positioning means attached to said pivot ring, said positioning means helping to maintain said elongated pointer in a horizontal orientation;

said level-seeking mechanism being so disposed within said closed housing that said face end of said elongated pointer is proximate said transparent viewing window and is viewable therethrough; and (d) attachment means for attaching said trim position indicator to either the left side or the right side of the outboard motor's top cover;

said outboard motor having a propeller having a propeller shaft, said method comprising the steps of:

(a) removing the propeller from the propeller shaft;

(b) placing the line level directly upon the propeller shaft;

(c) tilting the outboard motor until said line level indicates that a level condition has been achieved;

(d) orienting said trim position indicator such that its left and right side walls are substantially vertical, and its top wall is as high as the left and right side walls, and tilting said trim position indicator until said face end is centered between two of said indicator markings; and (e) affixing said oriented trim position indicator of step (d) to side of said top cover of said outboard motor.

\* \* \* \* \*

UNITED STATES PATENT AND TRADEMARK OFFICE
CERTIFICATE OF CORRECTION

PATENT NO. : 5,800,221
DATED : September 1, 1998
INVENTOR(S) : Dombrowski, Thomas A; et al Page 1 of 2

It is certified that error appears in the above-identified patent and that said Letters Patent is hereby corrected as shown below:

In the drawings, Sheet 6, Fig. 6, the reference numeral 83 should be applied to the dashed line which extends from pivot ring 50 and passes through the level-seeking mechanism pivot stop 64.

In the drawings, Sheet 12, Fig. 12, there is an erroneous reference numeral 56. The "upper" reference numeral 56 (and its lead line) which is applied to the elongated thin rectangularly shaped strip of lightweight rigid material 126 should be deleted. (The "lower" reference numeral 56 is correctly applied to the lower anchor weight 124.)

Column 9, lines 18-20, the sentence fragment "The front wall 32 has a clear transparent viewing window 40 which, preferably arches outward from the front wall 32" should read --As shown, the front wall 32 is a clear transparent viewing window 40 which, preferably, arches outward from the closed hollow housing 22--.

Column 11, lines 48-50, the sentence fragment: "In some applications of Applicants' trim position indicator, it may be considered necessary to further dampen motion of the positioning means 56." should read --In some applications of Applicants' trim position indicator, it may be considered necessary to further dampen the motion of the level-seeking mechanism 26.--.

UNITED STATES PATENT AND TRADEMARK OFFICE
CERTIFICATE OF CORRECTION

PATENT NO. : 5,800,221
DATED : September 1, 1998
INVENTOR(S) : Dombrowski, Thomas A; et al It is certified that error appears in the above-identified patent and that said Letters Patent is hereby corrected as shown below:

Column 19, line 27, "FIG. 9" should read --FIG. 8--.

Column 22, line 41 should be deleted.

Signed and Sealed this

Fifth Day of January, 1999

Attest:

Attesting Officer

*Acting Commissioner of Patents and Trademarks*